(12) United States Patent
Beilinson et al.

(10) Patent No.: US 7,441,182 B2
(45) Date of Patent: Oct. 21, 2008

(54) DIGITAL NEGATIVES

(75) Inventors: Craig Beilinson, Bellevue, WA (US);
Benjamin L. Perry, Seattle, WA (US);
Christopher A. Evans, Sammamish, WA (US); Clint Jorgenson, Carnation, WA (US); Jae Pum Park, Redmond, WA (US); Linda Hong, Kirkland, WA (US); Pritvinath Obla, Kirkland, WA (US); Anthony T. Chor, Bellevue, WA (US); Wei Feng, Seattle, WA (US); Alexander Castro, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 10/692,453

(22) Filed: Oct. 23, 2003

(65) Prior Publication Data

US 2005/0091270 A1 Apr. 28, 2005

(51) Int. Cl.
*G06F 17/00* (2006.01)

(52) U.S. Cl. .................. 715/229; 715/201; 382/181

(58) Field of Classification Search .................. 715/511, 715/512, 229, 201; 382/181
See application file for complete search history.

(56) References Cited

U.S. PATENT DOCUMENTS

| | | | | |
|---|---|---|---|---|
| 6,647,125 | B2 * | 11/2003 | Matsumoto et al. | 382/100 |
| 6,732,162 | B1 * | 5/2004 | Wood et al. | 709/219 |
| 6,870,547 | B1 * | 3/2005 | Crosby et al. | 345/619 |
| 6,904,185 | B1 * | 6/2005 | Wilkins et al. | 382/311 |
| 2003/0059202 | A1 * | 3/2003 | Yoda | 386/69 |
| 2003/0210335 | A1 * | 11/2003 | Carau et al. | 348/231.2 |

OTHER PUBLICATIONS

Reinhard, Erik, et al, "Photographic Tone Reproduction for Digital Images", ACM Transactions on Graphics (TOG), Proceedings on the 29th Annual Conference on Computer Graphics and Interactive Techniques SIGGRAPH '02, vol. 21, Issue 3, Jul. 2002, pp. 267-276.*

* cited by examiner

*Primary Examiner*—Laurie Ries
(74) *Attorney, Agent, or Firm*—Lee & Hayes, PLLC

(57) ABSTRACT

Systems and methods for digital negatives are described. In one aspect, a digital negative is created on a computing device from a digital image. The digital image is linked to the digital negative. In response to a save operation associated with the digital image, a new digital image is generated and bi-directionally connected to the digital negative. In response to a revert operation associated with the new digital image, contents of the new digital image are replaced with contents of the digital negative.

56 Claims, 16 Drawing Sheets 1100 (Cont'd)

DIGITAL NEGATIVES

TECHNICAL FIELD

The invention pertains to file management.

BACKGROUND

Despite recent advancements in Personal Computer (PC) technologies and the influx of digital photography into the consumer marketplace, users may not store and/or process digital images on a PC. This is often out of a concern of permanently losing the digital images. For example, a user may make an unanticipated and/or undesirable change to a prized digital image on a PC, and afterwards, not be able to recover the original, unedited digital image. One reason for this is due to the lack of integration of photo management operations with other common user activities on the PC that may involve digital images. As a result, users are typically dissatisfied with the PC's lack of secure/trustworthy photo management capabilities, and PCs are often not utilized in digital photo processing and/or storage lifecycles.

SUMMARY

Systems and methods for digital negatives are described. In one aspect, a digital negative is created on a computing device from a digital image. The digital image is linked to the digital negative. In response to a save operation associated with the digital image, a new digital image is generated and bi-directionally connected to the digital negative. In response to a revert operation associated with the new digital image, contents of the new digital image are replaced with contents of the digital negative.

BRIEF DESCRIPTION OF THE DRAWINGS

In the figures, the left-most digit of a component reference number identifies the particular figure in which the component first appears.

FIG. 4 shows further aspects of the procedure of FIG. 3 to manage storage of a digital negative when a backup engine is being used to backup files on the computing system.

DETAILED DESCRIPTION

Overview

Figure 1:
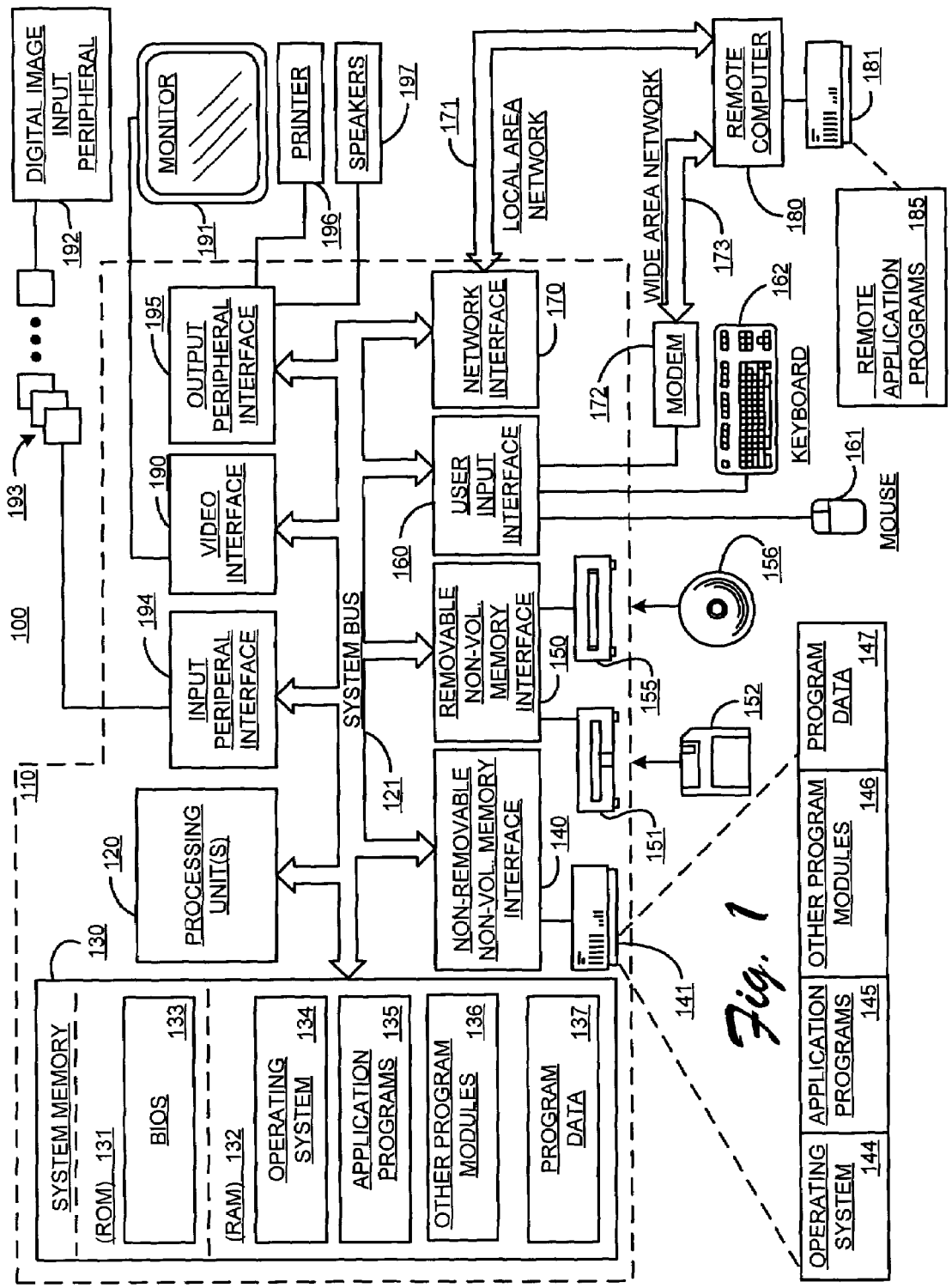
FIG. 1 illustrates an example of a suitable computing environment on which a framework (e.g., methods, computer-readable media, apparatus, Application Programming Interface (API), User Interface (UI), and so on) for generating, managing, and utilizing digital negatives may be implemented.

The following systems and methods for digital negatives incorporate secure/trustworthy digital image management into picture-specific and day-to-day tasks/operations that involve photographic content that a user may perform on the PC. A digital negative is a snapshot, or copy of a picture created (automatically and/or manually) at a specific point-in-time from a digital image/picture. Although a picture and/or image objects derived therefrom may be subsequently modified, pixel content of a linked digital negative does not change unless the user explicitly modifies the content of the digital negative. The digital negative is automatically linked to the picture on which it is based, and automatically linked to any versions, copies, and/or versioned copies of the picture (i.e., derived image objects) throughout the lifecycle of the picture and picture versions. A user can revert a versioned picture (i.e., across any number of pictures copies, versions, versioned copies, and/or the like) back to the original pixel content of a linked digital negative to which it is linked—the digital negative being a snapshot of the picture's pixel content at a previous point-in-time (i.e., when the digital negative was created from the picture).

For instance, a digital negative is automatically and/or manually created for an original picture when the picture is acquired, created, or first modified by an application. When a user edits or otherwise changes the original picture's pixel content, a subsequent implicit save operation (user or system implemented) of the changes replaces the original picture with a different version of the picture. Automatically, the link between the digital negative and the original picture is deleted, and the digital negative is linked to the new (different) version. This process is iterative, meaning that if additional edits are made to the new version of the picture and then implicitly saved, the new version becomes the old version, which is replaced with the new version comprising the edits. As before, automatically, the link between the digital negative and the previous version is removed, and a link is created between the digital negative and the latest version of the picture.

Such image replacement-type picture versioning creates a linear version history of a picture (digital image), wherein older versions of the picture are overwritten with newer versions of the picture, and wherein the most current set of changes to the picture, if any, are linked to a digital negative (one digital negative for a given picture). For purposes of discussion, a picture's version history may have a depth of zero (0) or greater, wherein a version history with a depth of 0 means that a picture has not been modified since it was acquired or created.

Additionally, when a picture is copied to another file, for example, via a "save-as . . . " or a copy operation, then the versioning history of the picture may develop along at least two separate linear progressions via implicit saves of changes made to respective ones of the pictures. For instance, if a picture is copied to n different file names, respective linear version histories of the picture may progress independently along n different paths. Yet, regardless of the number of linear paths along which a versioning history of a particular picture may progress, as changes are made to the picture most recent versions of the picture (i.e., along respective ones of the paths) are automatically (or manually) connected to the digital negative of the picture from which the copy or copies were based. In either of these scenarios (i.e., across any number of picture copies, versions, versioned copies, and/or the like), a user can selectively revert any of one or more latest picture versions in any of one or more linear version history progressions of original picture content back to the original pixel content of the digital negative to which the one or more latest picture versions are linked.

For additional digital image management security and flexibility, the systems and methods for digital negatives provide an API and UI controls to respectively integrate with applications and users so that applications and application users can create and manage digital negatives across single or multiple picture version history progressions. Such digital image management on the PC is facilitated with a logical UI view into one or more sets of related digital images. This logical view is generated by combining the concepts of a digital original of picture (i.e., a digital negative) with picture versioning, and picture/version copies (copies may in turn be versioned), and so on, to provide a view that is automatically organized across picture version histories and corresponding digital negative (s). Such a logical view presents a user with flexibility to manage digital image version histories and recover original pixel content of a pre-existing pixel representation based on a linked and pre-viewable digital negative.

These and other aspects of the systems and methods for digital negatives are now described.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described framework for digital negatives may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for digital negatives includes a general purpose computing device in the form of a computer 110. Components of computer 110 may include, but are not limited to, one or more processing units 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they are at least different copies.

A user may enter commands and information into the computer 110 through input devices such as a keyboard 162 and pointing device 161, commonly referred to as a mouse, trackball or touch pad. Such commands and information include, for example, the identity/location of digital image data such as a family photo album for face annotation, a command to search a data set for an image that includes a particular face or annotated name, user face annotation relevance feedback, and so on. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. The monitor can be used to display digital images with one or more linear versioning histories and at least one corresponding digital negative. The digital negative secures a particular pixel content version of the digital image for pixel content reversion with respect to any one or more of the latest versions of the digital image. In addition to the monitor, computers may also include other peripheral output devices such as speakers 197 and printer 196, which may be connected through an output peripheral interface 195.

A peripheral 192 such as a digital/electronic still or video camera, image scanner, and/or the like, capable of capturing one or more images 193 (e.g., digital photographs) may also be included as an input device to the computing device 110. Further, while just one digital image input peripheral is depicted, multiple similar or different digital image input devices can be coupled to the computing device 110. Images 193 from the one or more peripherals 192 are input into the computer 110 via an appropriate data input peripheral interface 194. This interface 194 is connected to the system bus 121, thereby allowing digital images 193 to be routed to and stored in the RAM 132, or one of the other data storage devices associated with the computer 110. Besides and/or in combination with the digital image input peripheral 192, digital image data 193 can be input into the computer 110 from any of the aforementioned computer-readable media.

The computer 110 may operate in a networked environment using logical connections to one or more remote computers, such as a remote computer 180. The remote computer 180 may be a personal computer, a server, a router, a handheld device such as a handheld PC, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks of various implementation such as one or more wireless communication networks. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary and other means of establishing a communications link between the computers may be used.

Exemplary Application Programs and Data

Figure 2:
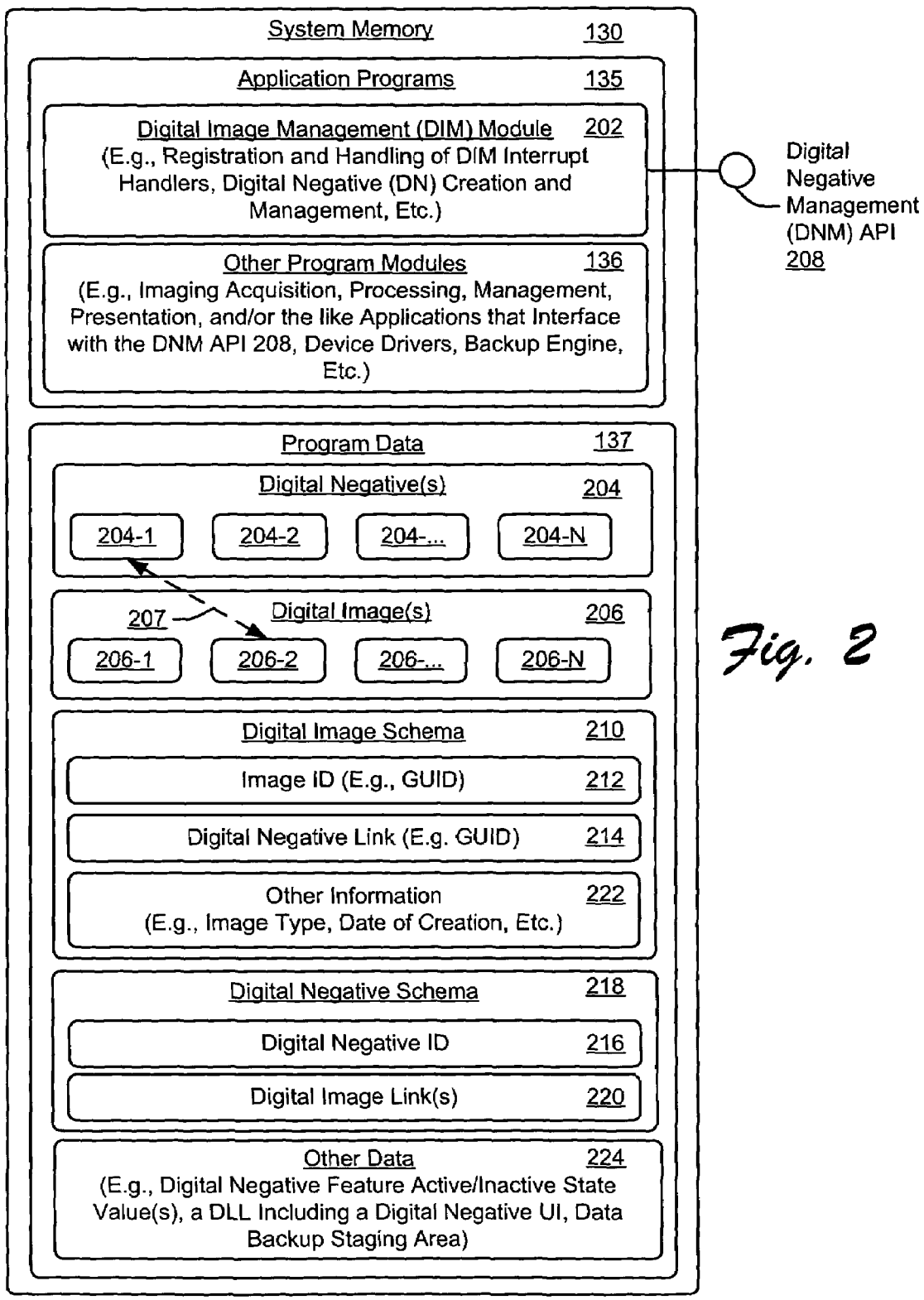
FIG. 2 is a block diagram that shows further exemplary aspects of system memory of FIG. 1, including application programs and program data generating, managing, and utilizing digital negatives.

FIG. 2 is a block diagram that shows further exemplary aspects of system memory 130 of FIG. 1, including application programs 135 and program data 137 for generating and managing digital negatives. (In the figures, the left-most digit of a component reference number identifies the particular figure in which the component first appears). In this implementation, application programs 135 include, for example DIM module 202 to generate and manage one or more digital negatives 204. A digital negative 204 is a copy of a digital image 206—the copy having been generated at a particular point in the lifecycle of the digital image 206. It can be appreciated that the digital negative can be a copy of any digital object such as a copy of digital video, digital audio, text documents, contact records, or any other type of digital data/object. However, for purposes of discussion, a digital image is utilized. For instance, in this implementation, the DIM module creates a digital negative 204 for each digital image 206 that does not already have a corresponding digital negative 204 when the image is first acquired by the computing device 110 (FIG. 1), the first time that the digital image 206 is edited, responsive to a manual or automatic save operation performed by the user of the image as a digital negative 204, and/or responsive to preconfigured operational criteria.

To these ends, the DIM module 202 exposes digital negative management (DNM) API 208 so that application developers can create a digital negative 204 when a digital image 206 is edited/modified for the first time, restore an image 206 to the characteristics of its corresponding digital negative 204 when a user decides to revert back to the corresponding digital negative 204, determine if a digital negative 204 for a particular digital image 206 exists, and delete a respective digital image's digital negative 204. For purposes of discussion, system level and other applications (e.g., $3^{rd}$ party applications) which interface with the DIM module 202 are represented by one or more of the "Imaging Acquisition, Processing, Management, Presentation, and/or the like, applications that interface with the DNM API 208" as shown in the "other program modules" 136 portion of application programs 135.

TABLE 1 shows an exemplary DNM API 208 for creating and managing digital negatives 204.

TABLE 1

AN EXEMPLARY DIGITAL NEGATIVE MANAGEMENT API

```
[
    object,
    uuid(abd39776-33ab-400c-90fl-e62548118ed5),
    helpstring("IImageNegative Interface"),
    pointer_default(unique)
]
interface IImageNegative: IUnknown
{
        HRESULT Create(IShellItem *psi, IPropertyStore
        *pps, DWORD dwFlags);
// create a negative for this shell item (see flags above)
        HRESULT Exists(IShellItem *psi); // does a
        negative exist for this shell
item?
        HRESULT Revert(IShellItem *psi); // revert
        the image refered to by
IShellItem to its digital negative
        HRESULT Delete(IShellItem *psi); // delete
        the negative for this shell
    item
}
```

As indicated by TABLE 1, the DNM API 208 includes, for example, the following interfaces:

Exists, to determine whether a digital negative 204 exists for a particular digital image 206 (*psi). Create, to create a digital negative 204 for a particular digital image 206, and store the link to the generated digital negative in a location identified by the IPropertyStore parameter. In this implementation, each digital negative is stored in the same directory folder as its corresponding digital image. For purposes of discussion, a shell is the default user experience including, for example, a start menu, file system browser, and so on.

Revert, to revert a digital image 206 (*psi) to its corresponding digital negative 204. Certain metadata (e.g., where the picture was taken, etc.) generated with respect to the digital image prior to reversion to a corresponding digital negative is maintained and not overwritten during revert operations. Other metadata, such as image layout, etc., may be changed when a picture with certain attributes is reverted to a picture with different attributes. For example, when a digital negative of horizontal orientation (landscape) is restored over a digital image of vertical orientation (portrait), the systems and methods will fix up metadata such that it will accurately reflect the reversion results.

Delete, to delete a digital image's corresponding digital negative 204. This effectively clears the digital image's reference to the digital negative.

In this implementation, the exemplary DNM API 208 of TABLE 1 is based on the Component Object Model (COM)—a platform-independent, distributed, object-oriented system for creating binary software components that can interact. For purposes of discussion, and unless otherwise indicated, use of a term Revert, Exists, Create, or Delete refers to a respective API 208 interface.

We now describe more detailed aspects of the DNM API 208. With respect to the Exists interface, whenever a digital image is created or imported by an application on/to the computer 110 (FIG. 1), the digital image is generated/imported with structure and components specified by the digital image Schema 210. For instance, each digital image 206 includes a digital image identifier (ID) 212 and a digital negative link 214, which is used to determine whether a corresponding digital negative 204 has been generated for a digital image—the digital negative link substantially uniquely identifies a corresponding digital negative if the digital negative exists. Digital image schema 218 may include additional structure and components, for example, "other Information" 222 such as an image type indication (JPEG, GIF, etc.), date of creation, etc.

In this implementation, digital negative link 214 values of null, or some other predetermined value may indicate that a digital negative 204 has not been generated for the digital image 206. Otherwise, the digital negative link is a globally unique identifier (GUID) that was assigned to the digital negative when the digital negative was generated (via Create) for the digital image. Digital negative ID 216 illustrates such a GUID. In other words, assuming a digital negative 204 has been created at some point in time for a digital image 206 and not later removed (Delete), the digital image's digital negative link 214 will specify the digital negative's digital negative ID 216. This is how digital images 206 are connected to their corresponding digital negatives 204. Such a GUID reference link between a digital image 206-2 and a digital negative 204-1 is shown by the dotted directional line 207 between respective ones of the digital images and the digital negatives.

In one implementation, applications can query on each digital image's digital negative link 214 to find its corresponding digital negative 204, for instance, to maintain an index pointing each digital image 206 to its associative digital negative 204. For purposes of discussion, such applications are shown as respective portions of "other program modules" 136 of FIGS. 1 and 2.

With respect to the Create interface, Create generates a digital negative 204 with structure and components specified by the digital negative schema 218. For instance, the digital negative will include a digital negative ID 216 and one or more digital image Links 220. Although a digital image will have at most one digital negative, the digital negative may be utilized by multiple digital images as described below. In this implementation, the digital negative ID is a Globally Unique Identifier (GUID) assigned to the digital negative as it is generated. The digital image link(s) identify respective GUID(s)—digital image ID(s) 212—of the digital image(s) 206 that utilize the digital negative as a proof copy.

The content of a digital image 206 may change over time (e.g., via user editing, copy, save, and/or other operations). However, unless the user explicitly maps such changes/edits to the corresponding digital negative 204, the digital negative will reflect the pixel content of the version of the digital image from which the digital negative was made.

In this implementation, to allow substantial system level control over the use (creation and management) of digital negatives 204, system administrators and/or other users are permitted to specify whether the digital negative feature (i.e., the use of digital negatives 204 for digital image 206 management) is desired. In one implementation, a user selects whether the digital negative feature is active (on/off) via system level control such as that provided by a control panel (e.g., a "Configure Digital Negative Settings" option). In another implementation, the user is presented with the option to activate the digital negative feature via interaction with a task bar that is presented in a window, for example, a window that displays a directory-based folder and/or some other arrangement that includes one or more digital images 206. In general, options to control the state of the digital negative feature are presented to the user via one or more user interface (UI) controls, for instance, such as those available to system level and other applications via the digital negative UI portion of "other data" 224.

Only when the digital negative feature is turned on for a particular object or set of objects is application level interaction with the DNM API 208 permitted with respect to that object or set of objects. An object can be a digital image 206 and/or a container object such as a folder or some other logical representation for organizing/managing sets of objects. Although actual digital negative feature on/off state values may be selectively associated with specific objects, sets of objects, etc., user selected and default values indicating whether the digital negative feature is on/off for a respective object, set of objects, and/or the like, are maintained as "Digital Negative Feature Active/Inactive State Values(s)", as shown in "other data" 224.

We now describe a number of examples of how DNM API 208 can be utilized to instruct the DIM module 202 to generate (Create) and manage (Exists, Revert, and Delete) digital negatives 204 for respective ones of the digital images 206.

Creating Digital Negatives

In one implementation, whenever a digital image 206 is acquired, or imported on/to the computing device 110 of FIG. 1 (i.e., the digital image does not yet have a corresponding digital negative 204), the digital image creating/importing application, or an imaging acquisition interface(s), calls Create to automatically generate a respective digital negative 204 from the digital image. Exemplary image acquisition interface(s) include, for example, implementations of the WINDOWS Image Acquisition (WIA) interface, Still Image (STI) event monitors coupled to such an acquisition interface, and/or other image acquisition interface(s) that have been modified to interface with Create. One can determine if a particular digital image has an associated digital negative via the Exists interface. In this implementation, a new file type extension is used to differentiate digital negatives 204 from digital images 206. Such new file type extensions are based on the data format used to generate the digital negative and include, for example, .jpgneg, .gifneg, .tifneg, and/or the like—note the "neg" suffix to the extension.

Additionally, if a digital image 206 is automatically or manually edited for the first time, and if the digital image does not already have a digital negative 204, a digital negative may be created (Create) for the digital image. Editing a digital image (picture) refers specifically modification of one or more pixels that comprise the picture, not the editing of metadata associated with the picture. For instance, responsive to acquiring a picture by an image acquisition layer/interface, the image acquisition layer may automatically apply image filters (e.g., red-eye or auto-correct options, and/or so on) to edit the picture. In such a situation, and in this implementation, if the picture does not have a corresponding digital negative, a digital negative is automatically created for the picture to save its pre-edited state/content. The newly created digital negative has not been altered in any way by the various filters that may have been automatically applied to the picture, but the digital negative is a viewable image. In this implementation, the digital negative is not a RAW version of the picture.

With respect to a first time manual edit of a digital image 206 (picture), if the picture does not already have a digital negative 204, the digital image management module 202 displays a dialog box (not shown) to inquire whether the user would like to create a digital negative 204 for the picture that was just edited (at this point both the pre-edited and the edited versions of the picture are in system memory).

In this implementation, the digital image management module 202 detects user edits by registering one or more interrupt handlers to trap and handle events such as a File Save event, which may correspond to an edit event. When such a trapped event is thrown by an application and caught by a corresponding interrupt handler, the interrupt handler determines whether the event corresponds to an edit of a digital image that does not have a corresponding digital negative. If so, the digital image management module displays a dialog box (not shown) asking the user if they would like to save a digital negative 204 for the picture that was just edited. For purposes of discussion, such a dialog box is provided by one or more digital negative specific user interface (UI) components of digital image library portion of "Other Data" 224, which may be implemented as a Dynamic Link Library (DLL).

In either case of a first-time automatic or manual edit of a digital image 206 that does not have a corresponding digital negative 204, whenever a digital negative is created for the digital image, the GUID of a generated digital negative 204 based on the pre-edited digital image is inserted into the digital negative link 214 data field of the edited digital image (a new image). The GUID of the edited digital image is inserted into the digital image link 220 data field of the generated digital negative.

Figure 3:
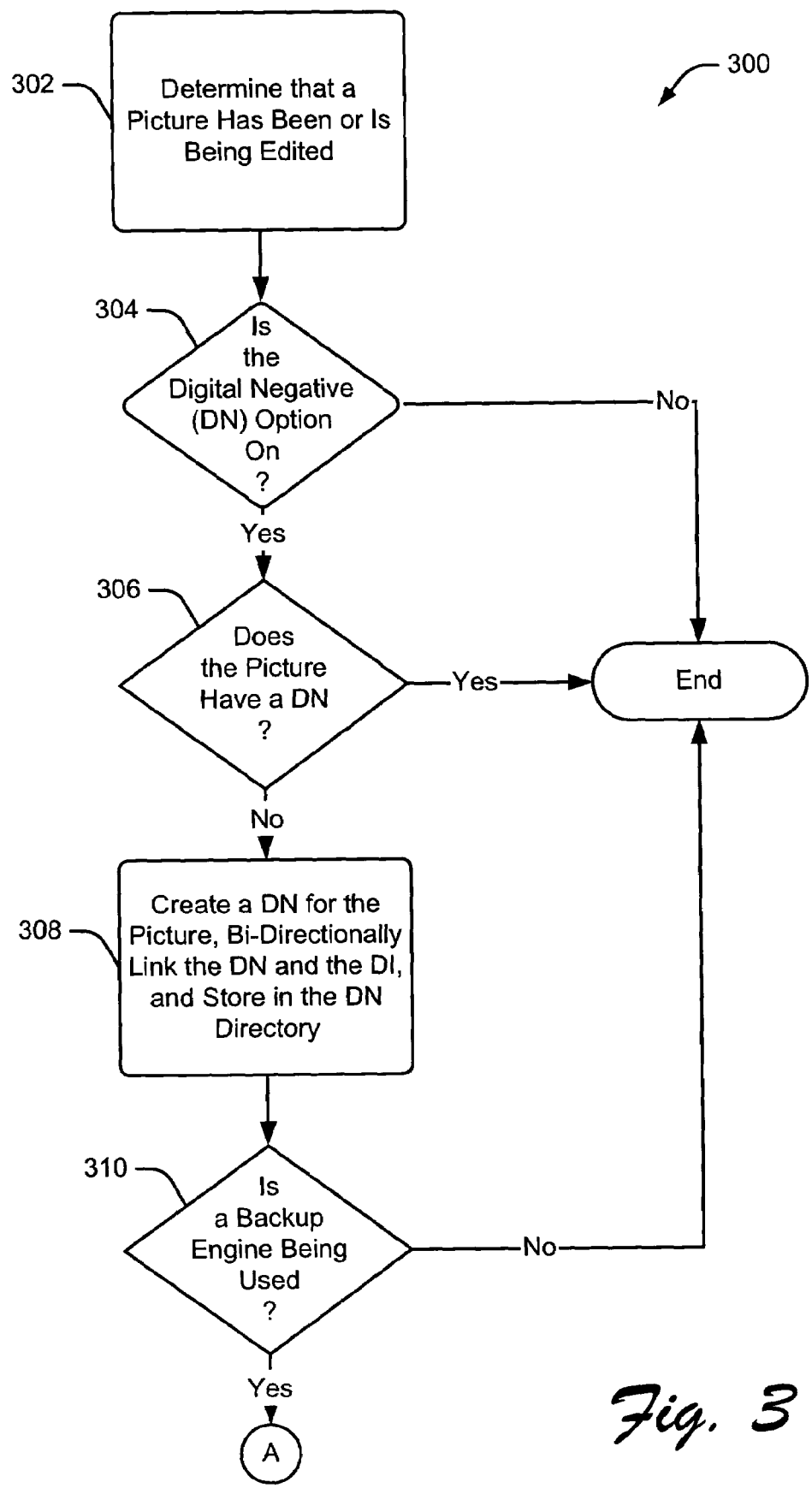
FIG. 3 shows an exemplary procedure for creating a digital negative in response to automatic and/or manual edits of a digital image.

FIG. 3 shows an exemplary procedure 300 for creating and managing a digital negative 204 in response to automatic and/or manual edits of a digital image 206. At block 302, The digital image management module 202 determines that a digital image 206 has been or is being edited. At block 304, the digital image management module 202 determines whether the digital negative feature is active. To accomplish this, the digital negative feature state value(s) portion of "other data" 222 is evaluated to determine whether or not the feature is active with respect to the digital image. (As discussed above, such a digital feature state value may correspond to one or more objects). If not, the procedure ends. Otherwise, the procedure continues at block 306, wherein the digital image management module determines whether the digital image has a corresponding digital negative 204. If not, the procedure 300 ends. Otherwise, at block 308, the digital image management module creates a digital negative for the digital image in stores the new digital negative into system memory 130.

At block 310, the digital image management module 202 determines whether a backup engine is being utilized to backup files on the computing device 110 (FIG. 1). If not, the procedure 300 ends. Otherwise, the procedure continues at block 402 of FIG. 4, as shown by on page reference "A", wherein the management of digital negatives is integrated with staging areas and backup processes.

Figure 4:
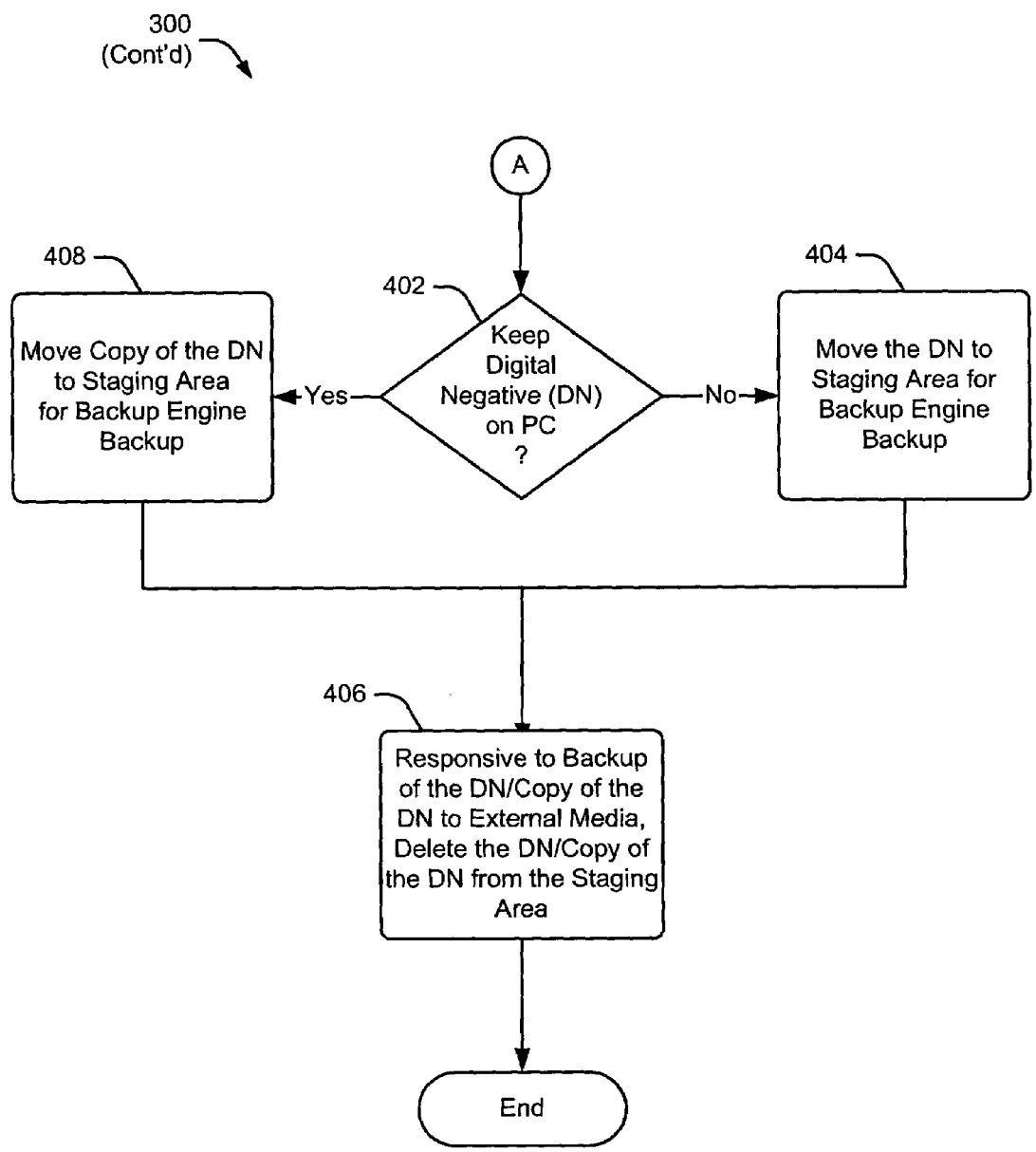
FIG. 4 shows an exemplary procedure for creating and managing a digital negative in response to automatic and/or manual edits of a digital image. In particular.

FIG. 4 shows an exemplary procedure for creating and managing a digital negative 204 in response to automatic and/or manual edits of a digital image 206. In particular, FIG. 4 shows further aspects of the procedure 300 of FIG. 3 to manage a digital negative when a backup engine is being used to backup files on the computing system. At block 402, the digital image management module 202 interfaces with a backup engine to determine whether or not the digital negative 204 should be maintained in the system memory 130 of the computing device 110 (FIG. 1). In one implementation, the information used to make such a determination is a user configurable digital negative configuration option. By using a backup service and keeping a digital negative on the PC, multiple copies of the digital negative are maintained.

If the digital negative 204 is not be maintained in the system memory 130, the digital image management module moves the digital negative to a location (staging area) in system memory for backup engine backup operations. At block 406, and responsive to the backup of the digital negative to external media (e.g., a compact disc, tape storage, and/or the like), the digital image management module deletes the digital negative from the staging area.

At block 408, responsive to determining that the digital negative 204 is to be maintained in system memory 130 (see also, block 402), the digital image management module 202 moves a copy of the digital negative to the staging area for the backup engine to backup the digital negative to external data storage. In this scenario, at block 406, and responsive to backup of the digital negative to external media, the digital image management module deletes the copy of the digital negative from the staging area.

In this manner the procedure 300 of FIGS. 3 and 4 creates and stores digital negatives 204 responsive to automatic and/or manual edits to a digital image 206. Operations to manage digital negatives for digital images responsive to revert, save, and copy operations are described in greater detail below in reference to FIGS. 5-7.

Restoring Digital Negatives

To allow a user to restore a digital image 206 to its digital negative 204, any application (e.g., including the operating system 134 of FIG. 1) implementing the digital negative management (DNM) API 208 provides a UI control such as a menu item, button, and/or the like that is linked to the Revert interface. For convenience, such UI controls are provided by the digital negative UI portion of "other data" 224. In one implementation, such a UI control specifies "Revert to Digital Negative" is displayed for user selection in the following scenarios:

In a task pane of a photo library, or any folder that has a file type of pictures.

On the right-click menu of any digital image 206 (picture) that has a digital negative 204.

On an Edit menu when viewing a picture that has a digital negative.

On a right-click menu when viewing a picture that has a digital negative.

If the digital negative feature is turned off, none of these entry points are available.

In this implementation, and responsive to user selection of "Revert to Digital Negative", one or more digital images 206 (photos) n may have been selected by the user. For each photo selected, the application utilizes the Exists interface to determine the number of photos m out of n that have a corresponding digital negative 204. Only one photo is selected with a corresponding digital negative, the application, for example, displays a dialog box informing the user that the selected photo will be replaced with the original version (i.e., the digital negative 204) of the photo and that the photo will be deleted. Whereas, when multiple photos m of n having corresponding digital negatives are selected, the application, for example, displays a dialog box informing the user that the current m photos will be replaced with the original versions of the photos and the m photos will be deleted. In either case, and at this point, the user can agree to or cancel the "Revert to Digital Negative" operation.

In one implementation, a user utilizes backed-up digital negatives to revert a corresponding current digital image and/or create a new digital image/digital negative pair from the backed-up digital negative. For instance, such a tool provides a UI that displays a list of previous file versions (e.g. backups made over time) may also display available digital negatives. The most recent digital negative that was created as a result of the most recent "create" action from the DNM API, as well as previously created digital negatives that were backed up by the backup & restore application. A current digital image/object is reverted to the backed-up digital negative by selecting the most recent digital negative (the current one) and choosing the revert task. Because the backup application maintains previous copies of past digital negatives, that file can be restored using the backup application and may or may not overwrite the current digital image or create a new digital image/digital negative pair as a function of the options provided by the backup & restore application.

If the user agrees to the Revert operation, the DIM module 202 attempts to locate the corresponding digital negative(s) 204 via the digital negative link 214 of each selected digital image 206. For each corresponding digital negative that is not located in system memory (e.g., where the digital negative was originally stored—see, the Create parameters, a backup staging area, etc.), the DIM module interfaces with a Backup Engine to determine whether the digital negative has been backed-up to an external data storage device (i.e., any device connected to the removable nonvolatile memory interface 150 of FIG. 1). If so, the digital negative is recovered from the external data storage device (e.g., "Please insert CD [Name of CD] to retrieve the Digital Negative for this picture."). For purposes of discussion, such a backup engine is represented by respective portion of "Other Program Modules" 136 of FIGS. 1 and 2, and a data backup staging area is represented by respective portion of "Other Data" 224 of FIG. 2.

At this point, the digital negatives(s) 204 corresponding to the digital image(s) 206 selected for the Revert operation have been located, or otherwise identified as unavailable. For each such located digital negative, the digital image 206 referenced by the digital negative (e.g., via the digital image link 220) is replaced with image contents of the digital negative. Note that the selected digital image(s) also reference the corresponding digital negative(s) via their respective digital negative link 214 data fields. In this implementation, and when a particular digital negative referenced by a digital image selected for reversion is not located, the user is provided with an option to create a digital negative based on and for the digital image.

Maintaining Digital Negatives

An Exemplary Implicit Save Operation

Figure 5:
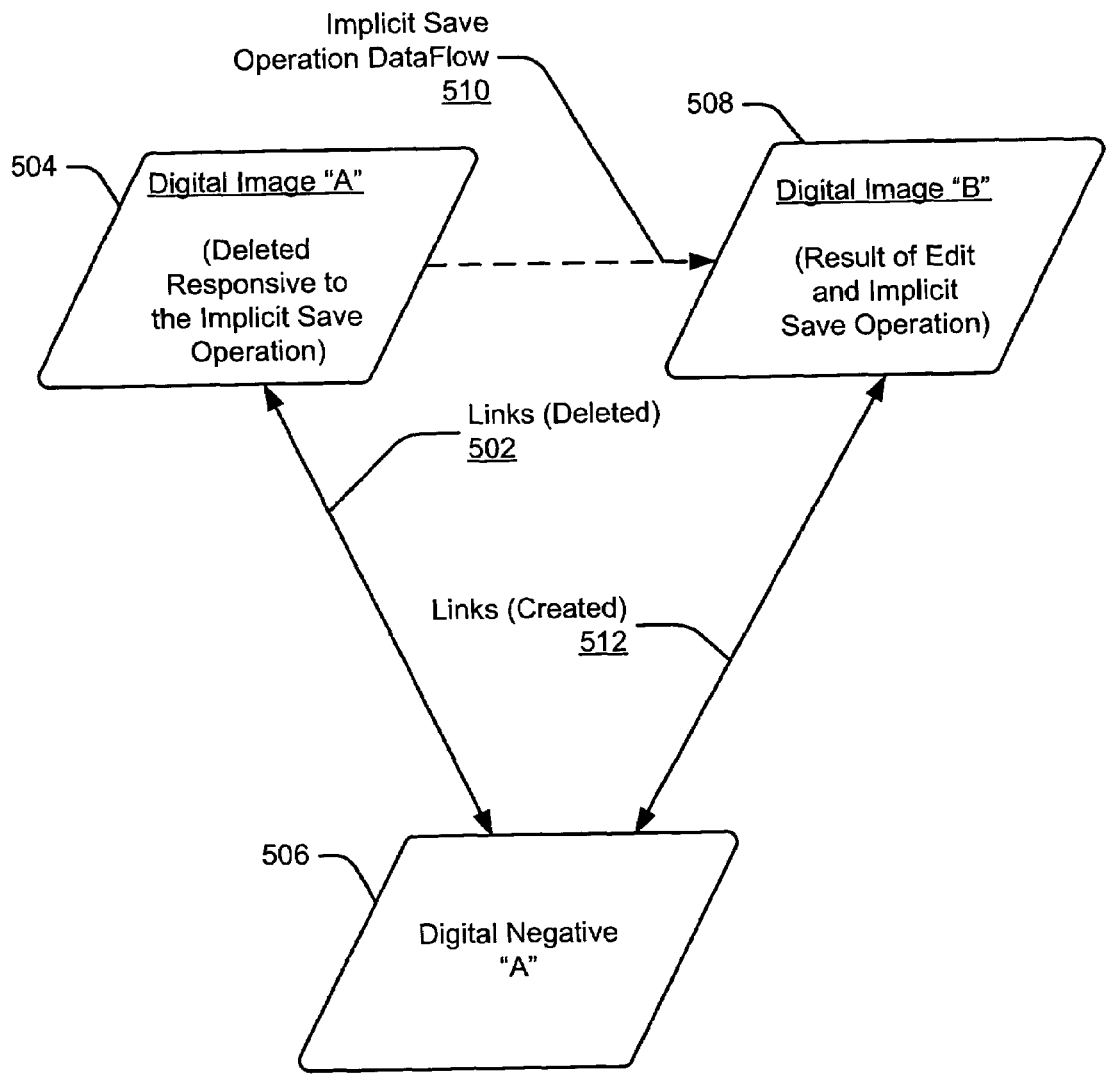
FIG. 5 is a block diagram that shows exemplary digital image/digital image and digital image/digital negative operational flow and data state responsive to implicit save operations.

FIG. 5 is a block diagram 500 that shows exemplary digital image/digital image and digital image/digital negative dataflow and state responsive to implicit save operations. An implicit Save operation is when a photo editing application or a service automatically saves changes to an altered photo without the end-user needing to explicitly choose a Save option or confirm the save operation. As a preliminary matter, and as already described, when a digital image 206 (picture) without a digital negative 204 is updated (acquired and/or edited for the first time), a corresponding digital negative is created for the picture as long as the digital negative feature is active with respect to the digital image. The picture and its corresponding digital negative are linked to one another via their corresponding substantially unique IDs (see, digital negative link 214 and digital image link 220 of FIG. 2).

Referring to FIG. 5, bidirectional link 502 (implemented with respective GUIDs) connects Digital Image "A" 504 to digital negative "A" 506. Responsive to an implicit save operation subsequent to an edit of Digital Image "A", Digital Image "A" is replaced by Digital Image "B" 508—the edit results (directional arrow 510 indicates operational and data flow). Link 502 is deleted by the digital image management module 202, which creates link 512 to connect Digital Image "B" to digital negative "A". At this point, digital negative "A" has had its digital image link 220 data field updated to match the GUID of Digital Image "B". However, the pixel data associated with digital negative "A" has not been changed from what the pixel data represented when digital negative "A" was linked to Digital Image "A".

An Exemplary "Save-As . . . " Operation

Figure 6:
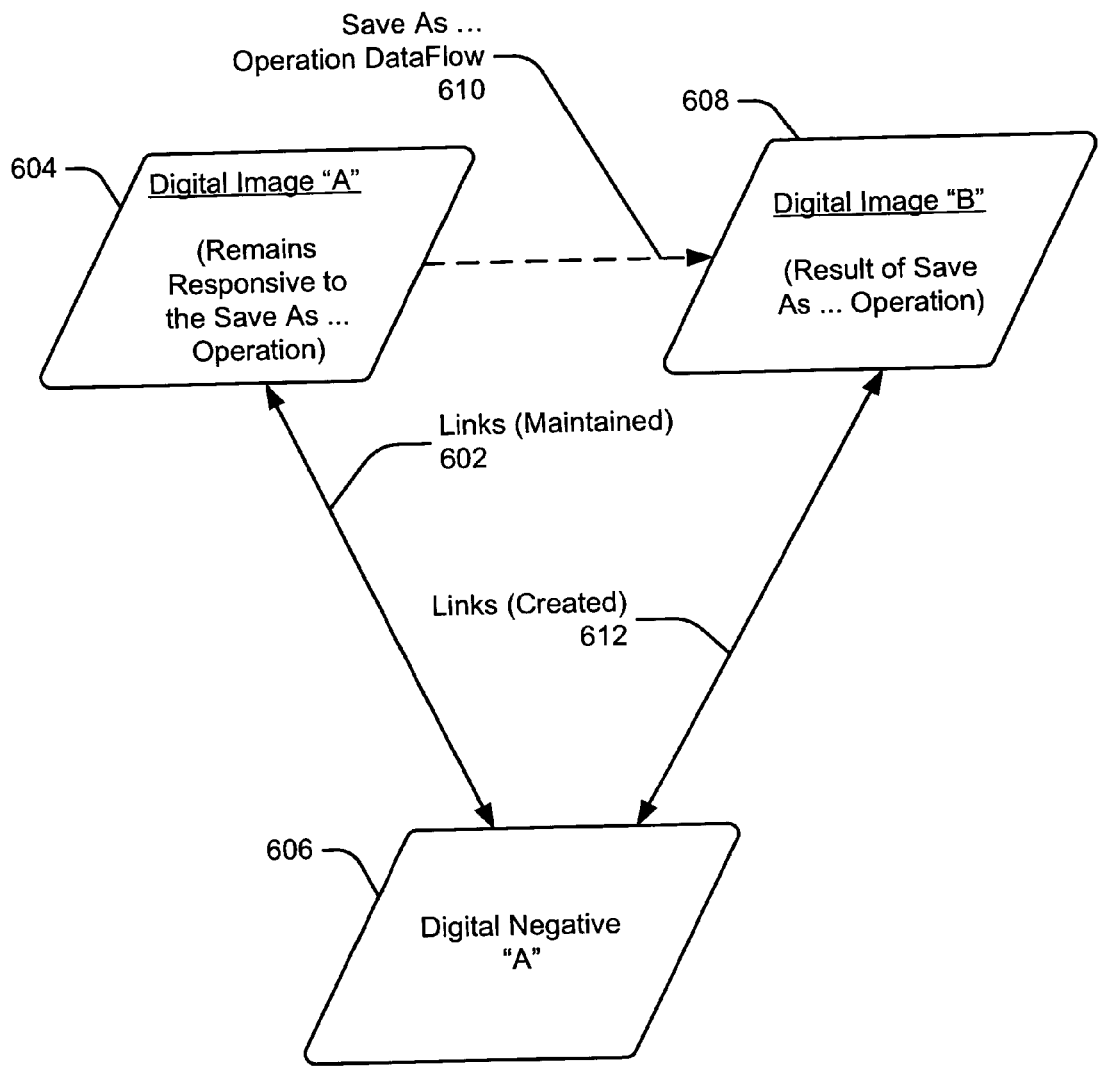
FIG. 6 is a block diagram that shows exemplary digital image/digital image and digital image/digital negative data flow and data state responsive to a "save-as" operation.

FIG. 6 is a block diagram 600 that shows exemplary digital image/digital image and digital image/digital negative data flow and data state responsive to a "save-as" operation. A "save-as" operation saves a copy of an object to the specified file. The "save-as" operations is hereinafter often referred to as a "'save-as'/copy" operation. When an application performs such an operation with respect to a digital image 206 (picture)—independent of whether or not the picture already has a digital negative 204—the picture upon which the operation is being performed as well as the resulting picture are linked to the same digital negative. In particular, each picture involved in the "save-as"/copy operation share the same digital negative via respective digital negative link 214 and digital image link 220 data fields.

For instance, referring to FIG. 6, bidirectional link 602 (implemented with respective GUIDs) connects Digital Image "A" 604 to Digital Negative "A" 606. Note that in this example, although not necessary, the digital image is already linked to a digital negative. Responsive to "save-as" or a copy operation with respect to Digital Image "A", a new picture Digital Image "B" 608 is created. Directional arrow 610 indicates "save-as"/copy operation flow and data flow. In this example, the original link 602 is maintained, and digital image management module 202 creates new link 612 to connect Digital Image "B" to Digital Negative "A". In a different scenario, wherein Digital Image "A" does not have a digital negative prior to the "save-as"/copy operation, bidirectional link 602 is also generated to link Digital Image "A" to a newly created (Create) digital negative "A" responsive to the "save-as"/copy operation. In either case, the resulting pictures (Digital Image "A" and Digital Image "B") are linked to a same digital negative, which in this example is Digital Negative "A".

An Exemplary "Create New Photo from Digital Negative" Operation

To allow a user to create a new digital image 206 (picture) from a digital negative 204, an application presents a UI control such as a menu item, button, and/or the like, for user selection. For convenience, such UI controls are provided by the digital negative UI portion of "other data" 224. In one implementation, such a UI control specifies "Create New Photo from Digital Negative", "Photo from Digital Negative", and/or the like. The UI control is displayed for user selection in the following scenarios:

In the task pane of a photo library, or any folder that has a perceived file type of pictures.

On a File/New/menu of a photo library, or any folder that has a perceived file type of pictures.

On the right-click menu of any picture that has a digital negative.

When a picture that has a digital negative is being viewed, on the File/New/menu of the corresponding window.

If the digital negative feature is turned off, none of these entry points for the "Create Photo from Digital Negative" task are available.

In this implementation, and responsive to user selection of "Create Photo from Digital Negative" after a digital image 206 (photo) has been selected, a new photo is created based on the digital negative of the selected photo (original photo). In one implementation, the new photo is provided with a substantially unique filename. Both the original photo and the new photo are linked via respective data fields 214 and 220 to the digital negative. This operation flow and data flow are similar to the operational flow and data flow discussed above respect to FIG. 6.

Make this the Digital Negative for this Picture

There are several scenarios wherein a user may benefit from an opportunity to change the digital negative 204 that is associated with a particular digital image 206 (picture). For instance, the user may not be interested in the first version of the digital image—as represented by its current digital negative. Instead the user would rather change the digital negative to reflect a current set of edits to the picture. In this scenario, a save-as operation would not provide the user with the desired digital negative characteristics.

To address this need, and responsive to a specific user action, an application presents a UI control such as a menu item, button, and/or the like, for user selection—the UI control specifying "Make This Picture the Digital Negative", or the like. In this implementation, the UI control is provided by the digital negative UI portion of "other data" 224. The UI control is displayed for user selection in the following scenarios (i.e., task entry points):

In the task pane of a photo library, or any folder that has a perceived file type of pictures.

On a right-click menu of any digital image 206 (picture) that has a digital negative 204.

On the Edit menu of any window, when viewing a picture that has a digital negative.

If the digital negative feature is turned off, none of these entry points for such a "Make This Picture the Digital Negative" task are available).

In this implementation, and responsive to user selection of "Make This Picture the Digital Negative" after a digital image 206 (picture) has been selected, if the picture was in the process of being edited, the application asks the user to either Save the picture's changes, or Cancel the changes. This action provides an indication of the respective version of the picture to use as the digital negative 204.

In one implementation, this results in the display of a dialog box asking the user, for example: "This will replace your digital negative with this version of the picture. Are you sure you want to do this? [Yes/No]". (Such a dialog box may be provided by the digital negative UI of "other data" 224). Responsive to user selection of "Yes" from the dialog box, the respective version of the picture replaces the previous digital negative. (The digital negative is linked to the respective version of the picture, and the respective version of the picture is linked to the digital negative). If no other digital images 206 were linked to the previous digital negative, then the previous digital negative is discarded. Otherwise, the previous digital negative remains, but it no longer has a link to the current picture (the respective version of the picture). That link has been removed.

Figure 7:
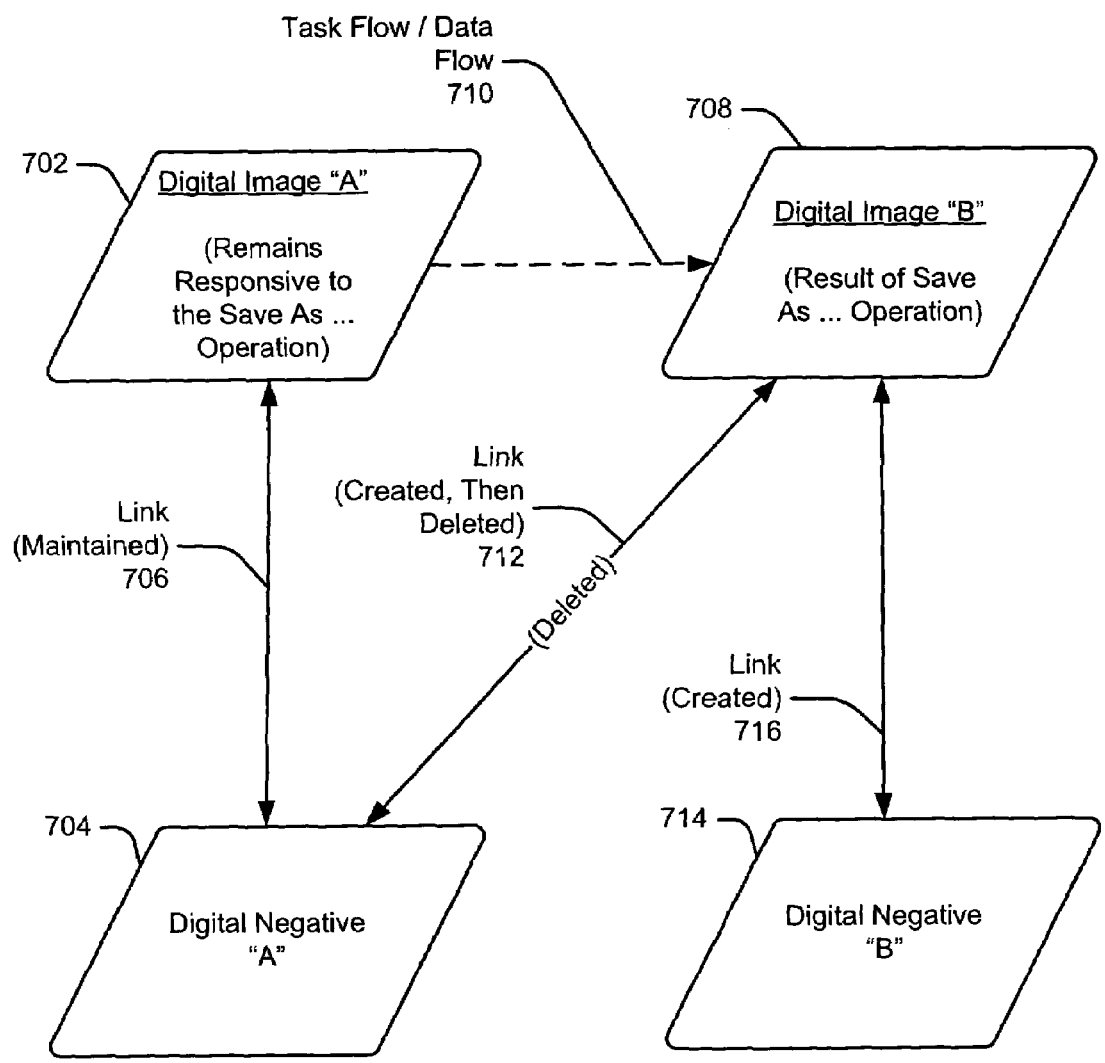
FIG. 7 is a block diagram that shows exemplary digital image/digital image and digital image/digital negative data flow and data state responsive to a user instantiated "Make This Picture the Digital Negative" type of operation.

FIG. 7 is a block diagram 700 that shows exemplary digital image/digital image and digital image/digital negative data flow and data state responsive to a user instantiated "Make This Picture the Digital Negative" operation. In this example, Digital Image "A" 702 is linked to Digital Negative "A" 704, and vice versa, via bidirectional link 706. Edits are made to Digital Image "A" resulting in Digital Image "B" 708. Directional arrow 710 represents task flow and data flow for such an edit operation. At this point "A" and "B" are linked to Digital Negative "A" via respective links 702 and 712. At this point, the user selects "Make This Picture the Digital Negative" with respect to Digital Image "B". Responsive to this action, bidirectional link 712 is deleted, and Digital Negative "B" 714 is created (Create) from Digital Image "B". Digital Negative "B" is linked to Digital Image "B", and vice versa, via bidirectional link 716. Links 706, 712, and 716 represent respective digital negative link 214 and digital image link 220 data fields.

An Exemplary Digital Negative Deletion Operation

In one implementation, assuming that a digital image 206 is associated with a corresponding digital negative 204, if the digital image (picture) is deleted by a user, the digital image management module 202 determines whether there are any other pictures that rely on the same digital negative. (Such a delete operation results in at least an application call to the Delete interface, and possibly one or more calls to the Exists interface). In one embodiment, this is accomplished by evaluating the one or more digital image link(s) 220 in the digital negative. As already described, each such link is a GUID to a picture that relies on the digital negative. Additionally, as reliance on the digital negative is generated and/or removed, the digital image management model respectively updates the respective GUID(s) in this data field.

If no such additional reliance is identified, then the digital negative 204 corresponding to the digital image 206 that is marked for deletion is also deleted. Otherwise, the digital negative is not deleted, but instead, the link from the digital negative to the digital image is removed from the digital negative's digital image link 220 data field. In this manner, when more than a single picture is linked to a digital negative, and although the link from the digital negative to the picture is removed, the digital negative is maintained for the non-deleted picture(s) that utilize the digital negative.

An Exemplary Digital Negative UI

Existing technology does not automatically manage logical views of digital images across originals, or proofs of a digital image in combination with various versions of the digital image. Instead, to generate such a view, a user typically must manually organize photos not just by date or event, but by other categories as well. For example, a user may have several versions of each picture in respective directory folders. Such versions may represents, for instance, image versions with lower-resolution compatible with e-mailing, image versions used for Web site publication, sepia-toned versions, etc., the number and types of changes that can be made to a digital image is virtually infinite. As can be appreciated, such manual organization is generally inconvenient, labor intensive, and time consuming.

To address this limitation of conventional UI techniques, the digital negative (DN) UI portion of the "other data" 224 combines the above described concepts of a digital original (i.e., a digital negative 204) with digital image (picture) versioning to provide a logical view into a set of related digital images. Such a logical view is automatically organized based on substantially unique GUIDS across picture versions, one or more configurable sets of which are selectively linked to a single one of multiple possible digital negatives associated with the one or more sets. This UI provides a user with a logical view of such complex data relationships as well as flexibility to revert any particular version of the picture back to a particular pre-existing pixel representation based on the linked digital negative.

Figure 8:
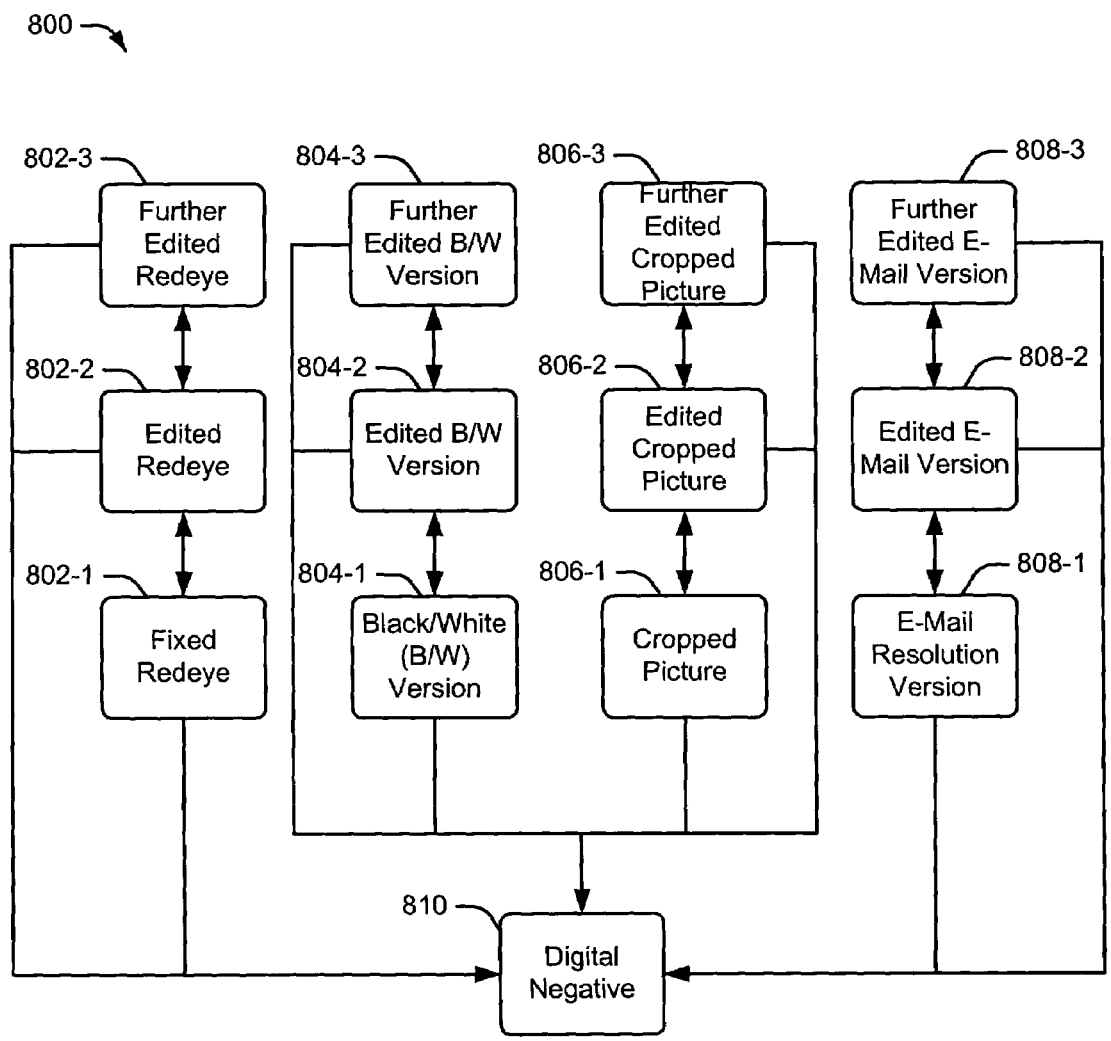
FIG. 8 shows a logical view into a set of digital images created by implicit save(s) and save-as/copy operations from a single proof (digital image) represented by the pixel content of the digital negative.

FIG. 8 shows a logical view 800 into a set of digital images 206 created by implicit save(s) and save-as/copy operations from a single proof (digital image) represented by the pixel content of the digital negative 204. Pictures 802 through 808 are respective digital images 206 of FIG. 2. This logical view presents all versions and version histories of an original picture with respect to one representation of original pixel content.

In this example, each picture column 1-4 (i.e., pictures 802-1 through 802-3 represent column 1, 804-1 through 804-3 column 2, 806-1 through 806-3 column 3, and 808-1 through 808-3 column 4), illustrates a respective version and version history of an original digital image 206. Although the original digital image is not shown, it had pixel contents equivalent to that of the digital negative 810, which is representative of a digital negative 204 of FIG. 2. In this example, as changes/edits were made to the picture versions from the bottom row to the top row, the changes replaced the previous respective picture version.

As a result, the last row—pictures 801-3 through 808-3 represents the latest picture versions. Bidirectional GUID links between the respective picture versions 802 through 808 and the digital negative 810 are shown via the vertical and horizontal connections between pictures and the digital negative. As such, the logical view provides links into a photo library grouped by picture family, and includes latest versions of a picture for presentation to a user—although all or some other version set, possibly including more than a single digital negative per single version set, could also have been represented as a function of user selected operations performed with respect to a picture.

Figure 9:
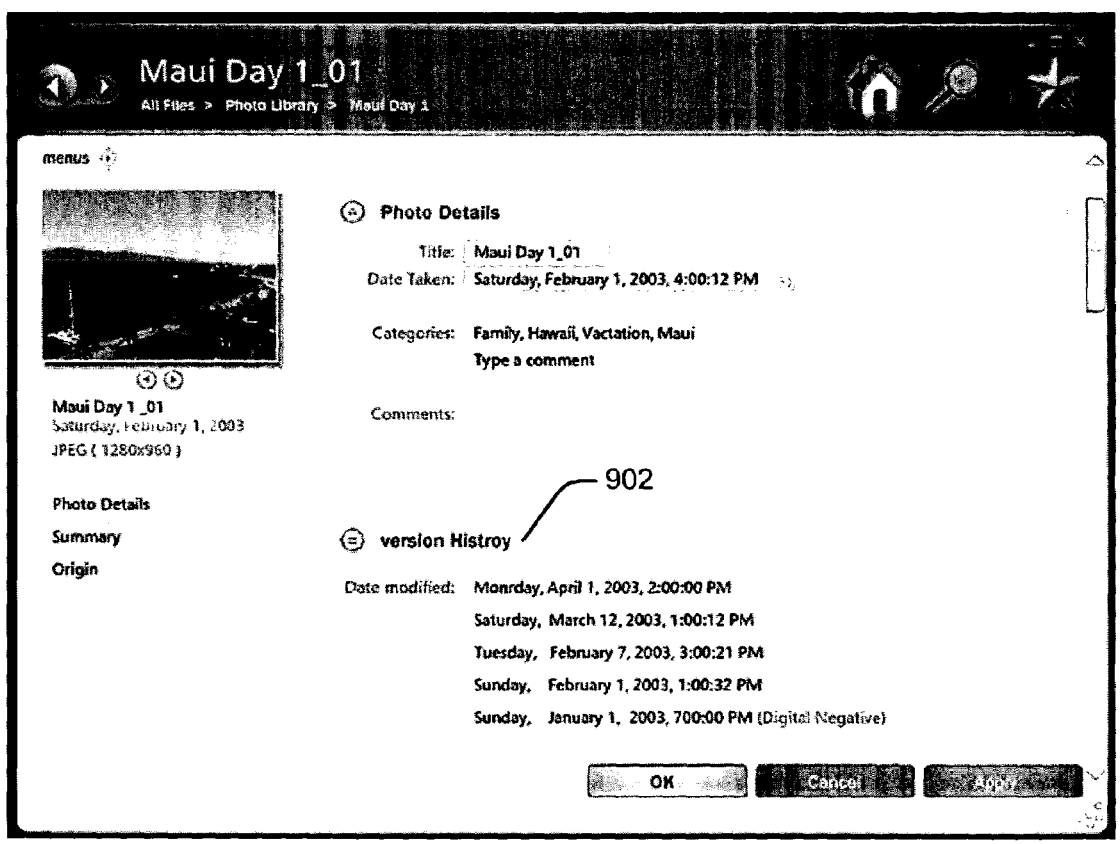
FIG. 9 shows an exemplary properties window for displaying properties of a digital image with a corresponding digital negative.

FIG. 9 shows an exemplary properties window 900 for displaying properties of a digital image 206 that has a corresponding digital negative 204. In this implementation, the controls and layout of the window are provided via the digital negative UI portion of "other data" 224. Such a window may be displayed in many different ways (e.g., a File/Properties menu item, a context sensitive menu item, and/or the like) by an application responsive to user selection of the digital image. Note that the digital image of this example is titled "Maui Day 1_01". The window 900 includes a version history portion 902 that specifies the date that the corresponding digital negative was last modified/created, as well as corresponding date(s) of modifications to the digital image.

Figure 10:
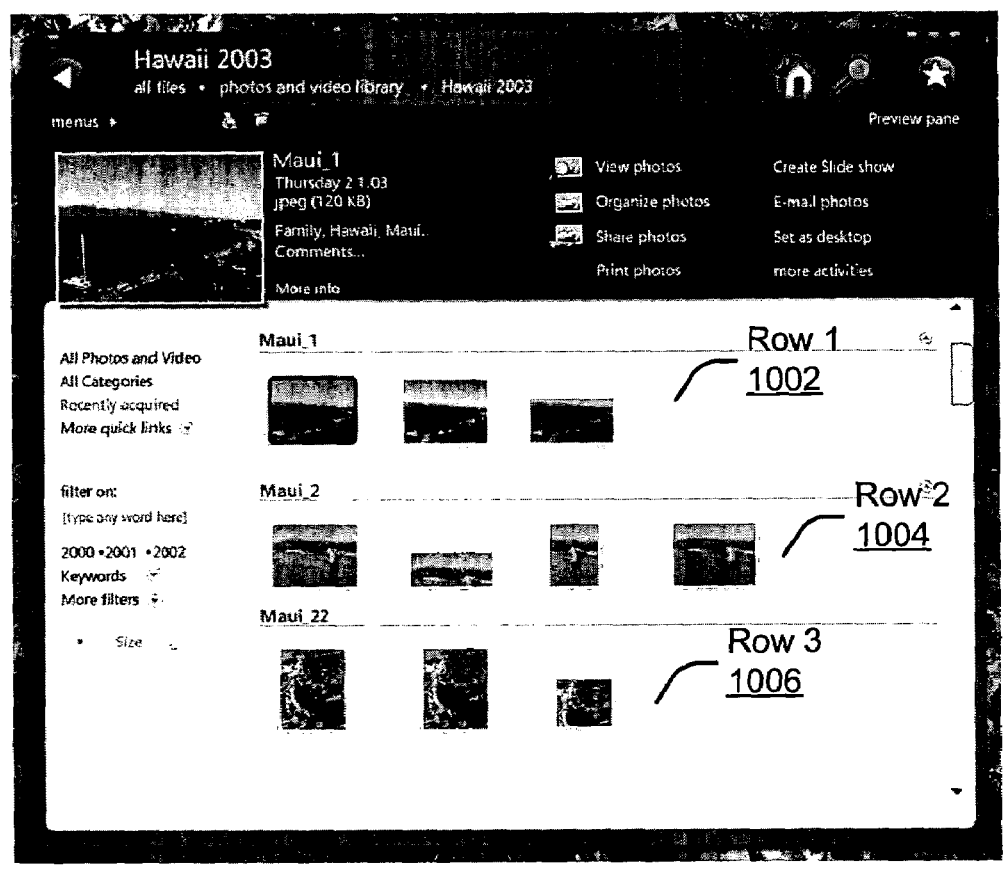
FIG. 10 shows an exemplary UI window for displaying a group of photos by digital image version history.

FIG. 10 shows an exemplary UI window 1000 for displaying a group of photos by digital image 206 version history family. For purposes of this example, the left-most photo of each row of pictures represents that picture family's corresponding digital negative 204. As shown by window 1000, each the versioning history of a photo is represented as a logical collection (e.g., folder), or a container of all the photos that came from a certain base pixel content. It may contain the digital negative, the cropped one, the black and white one, etc., in a location a user can easily find. In one implementation, this window is a view available on top of a virtual folder, of photos or any other file type.

An Exemplary Procedure for Digital Negatives

Figure 11:
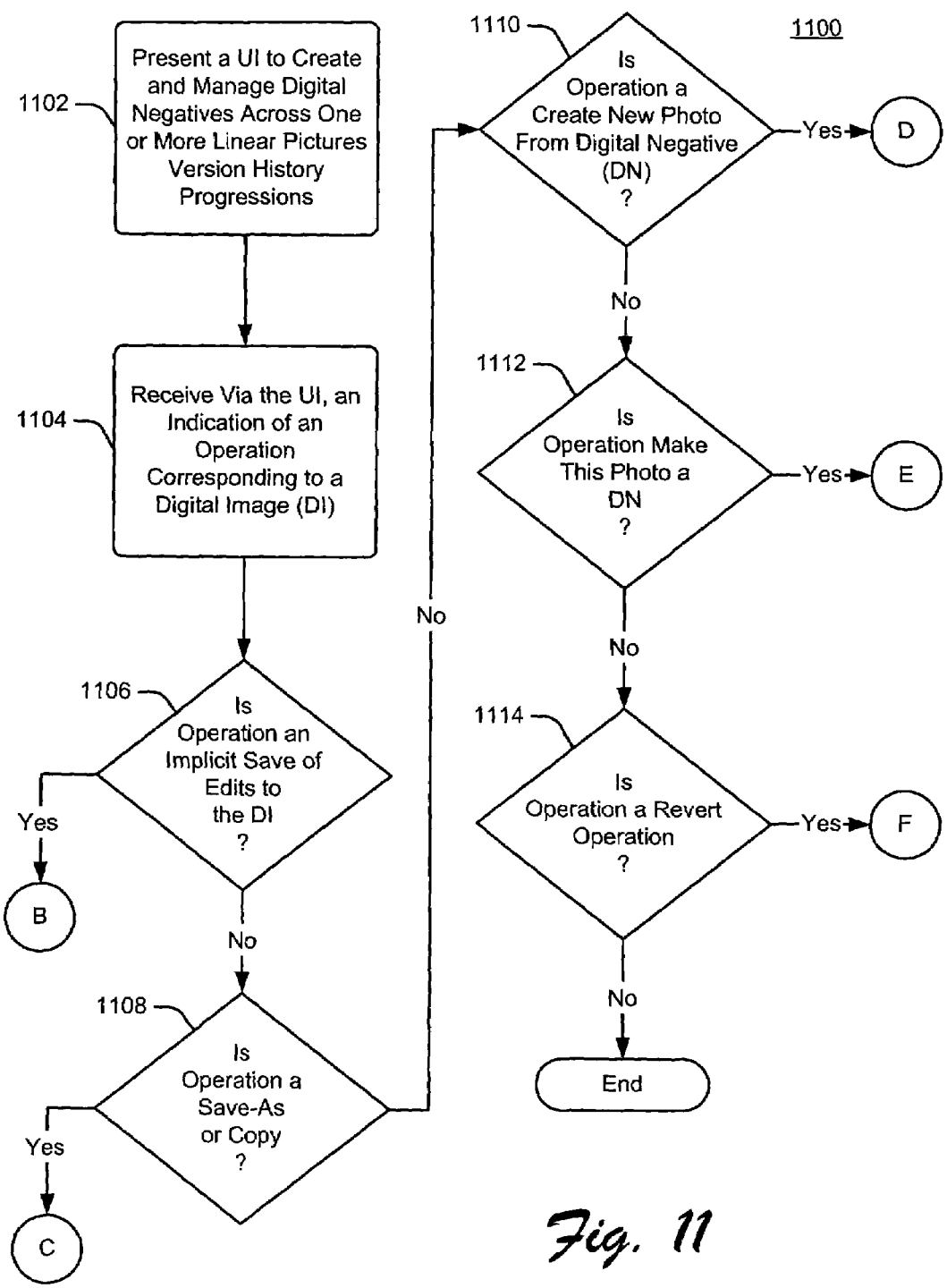
FIG. 11 shows an exemplary procedure to present a Digital Negative UI and to parse user interaction with the UI to create, manage, and utilize digital negatives.

FIG. 11 shows an exemplary procedure 1100 to present a Digital Negative UI and to parse user interaction with the UI to create, manage, and utilize digital negatives. As described above, a digital negative can be a copy of any digital object such as a copy of digital image, video, audio, text documents, contact records, or any other type of digital data/object. Thus, when the digital object is not a digital image or video, digital data may not include pixel content, but instead may include different digital data such as text, audio, etc. For purposes of this implementation, a digital image comprising pixel data/content is utilized.

Figure 12:
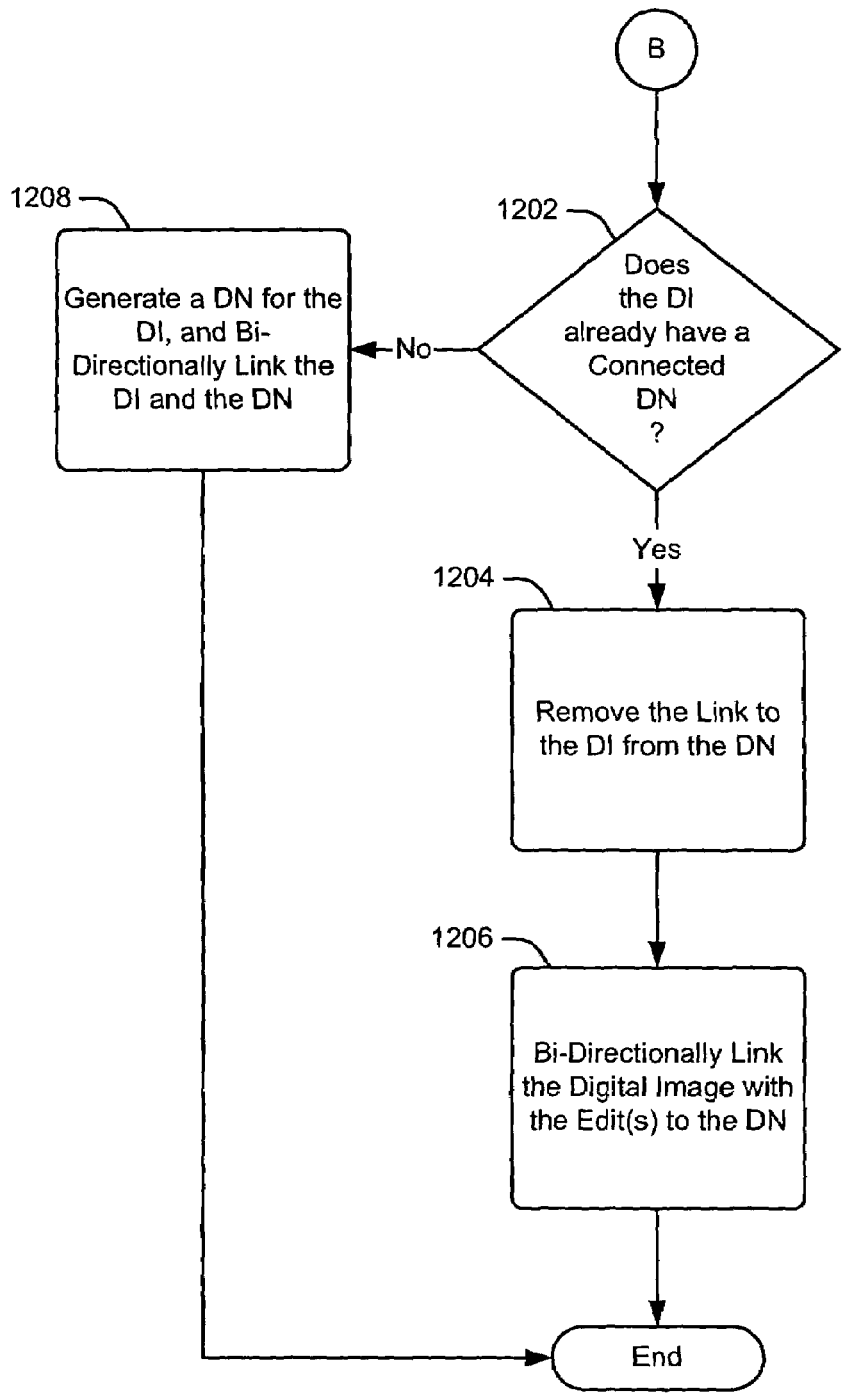
FIG. 12 shows an exemplary procedure to manage a digital negative in view of an implicit save of changes to a digital image.
Figure 13:
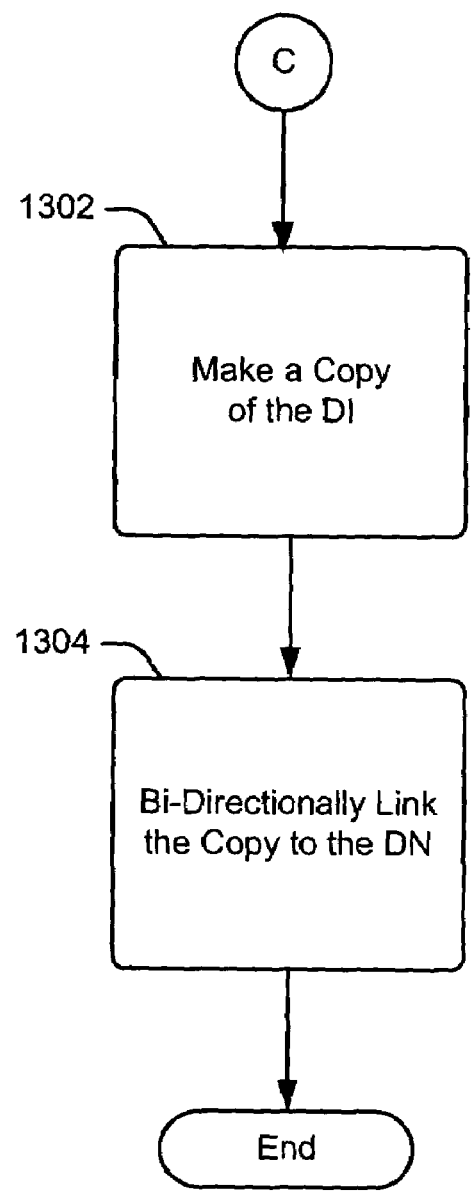
FIG. 13 shows an exemplary procedure to manage a digital negative in view of a "save-as" or copy operation directed to a digital image.

At block 1102, a user interface (UI) is presented on a display device for creating and managing digital negatives across one or more linear picture version history progressions. Aspects of such a user interface were described above in reference to the digital negative user interface portion of "other data" 224, and FIGS. 8-10. At block 1104, the DIM module 202 receives, via the user interface, an indication of an operation corresponding to a digital image 206. Blocks 1106 through 1114 parse the operation. In particular, at block 1106, the DIM module determines whether the operation is an implicit save of edits to the digital image. If so, operations continue at block 1202 of FIG. 12 as illustrated by on page reference "B". (Operations of FIG. 12 are described below). Otherwise, the procedure continues at block 1108, wherein the DIM module determines whether the operation is a save-as or copy of the digital image. If so, the operation continues at block 1302 of FIG. 13 as illustrated by on page reference "C". (Operations of FIG. 13 are described in greater detail below).

Figure 14:
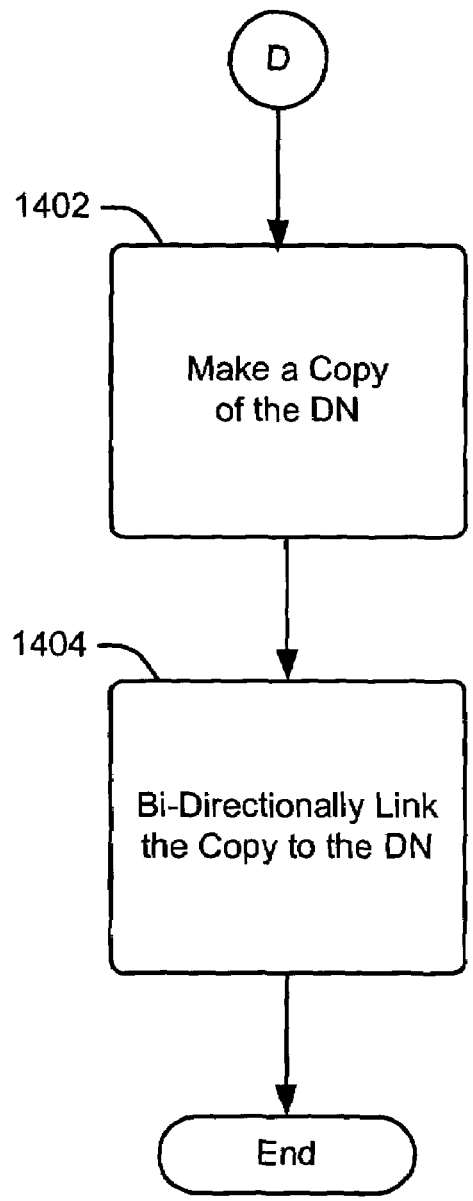
FIG. 14 shows an exemplary procedure to manage a digital negative in view of a user implemented request to create a new photo from a digital negative.
Figure 15:
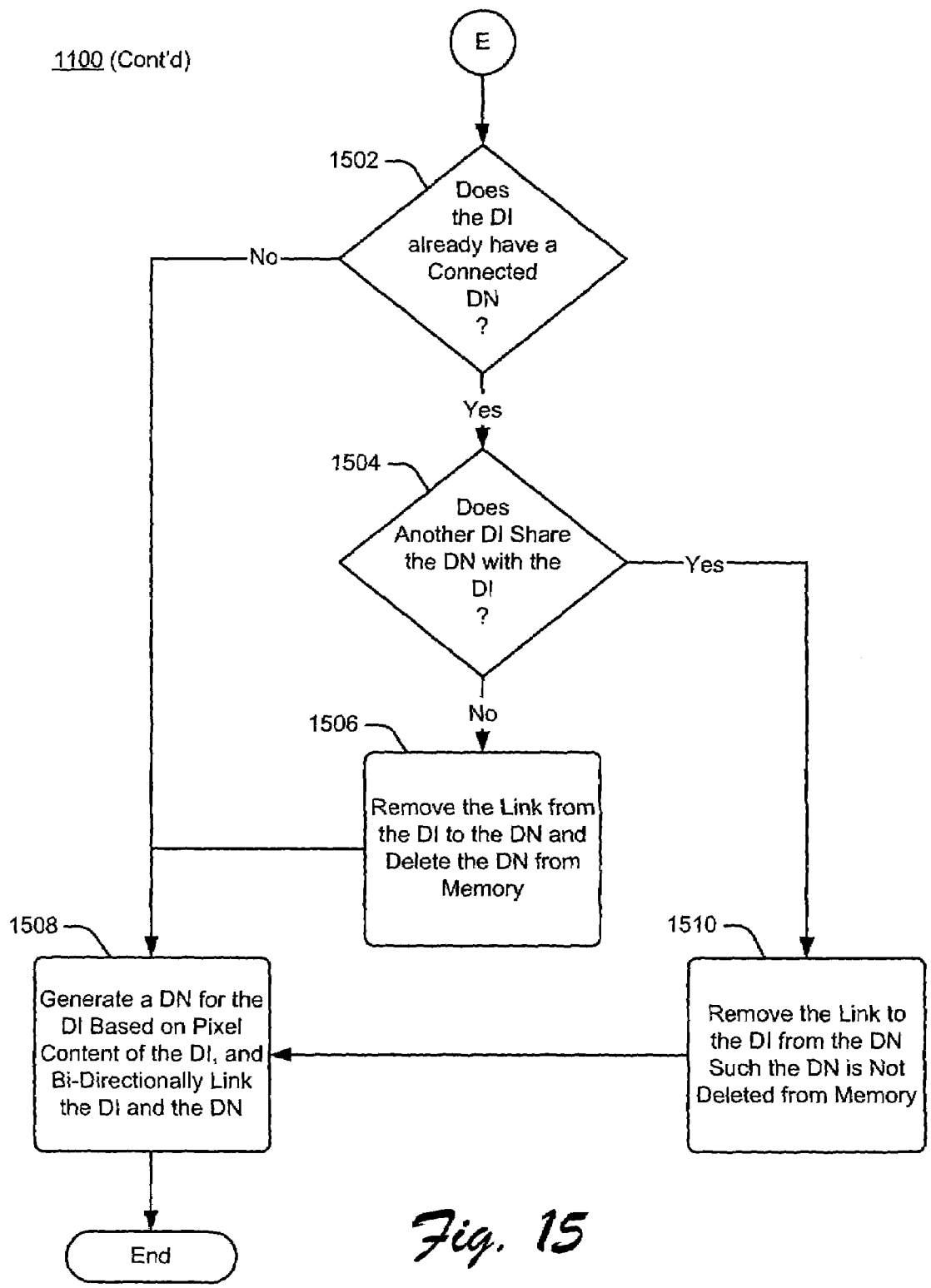
FIG. 15 shows an exemplary procedure to manage a digital negative in view of a user implemented request to make a particular photo the digital negative for the photo.

If the operation is not a save-as or copy operation, the procedure 1100 continues at block 1110, wherein it is determined if the operation is a "create new photo from a corresponding digital negative" operation. If so, the procedure continues at block 1402 of FIG. 14 as indicated by on page reference "D". (Operations of FIG. 14 are described in greater detail below in reference to FIG. 14). Otherwise, the procedure continues at block 1112, wherein the DIM module 202 determines whether the operation specifies to make a selected digital image (photo) into a digital negative. If so, the procedure 1100 continues at block 1502 of FIG. 15 as indicated by on page reference "E". (The operations of FIG. 15 are described in greater detail below). At block 1114, it is determined whether the operation is a revert operation, indicating that pixel contents of a selected digital image are to be replaced with pixel contents of a corresponding digital negative. If so, the procedure continues at block 1602 of FIG. 16 as indicated by on page reference to "F".

FIG. 12 shows further aspects of the exemplary procedure of FIG. 11. In particular FIG. 12 shows exemplary operations to manage a digital negative in view of an implicit save of changes to a digital image. At block 1202, the DIM module 202 (FIG. 2) determines whether an indicated digital image already has a digital negative associated with it. If so, the procedure continues at block 1204. At block 1204, the link to the old version of the digital image (i.e., the version that is not associated with edits/changes corresponding to the implicit save) is removed from the digital negative. For purposes of discussion, such a link is shown as a digital image link 220 of FIG. 2. In this particular example, the digital image link for removal would point to the previous version of the digital image. At block 1206, the new version of the digital image (i.e., the version that comprises the edits/changes corresponding to the implicit save operation) and the digital negative are bi-directionally linked to one another.

At block 1202, if the procedure 1100 determines that the digital image to which the implicit save corresponds does not have an associated digital negative, the procedure continues at block 1208. At block 1208, a digital negative comprising substantially similar pixel content as the digital image is created and bi-directionally linked to the digital image.

FIG. 13 shows further aspects of the exemplary procedure of FIG. 11. In particular FIG. 13 shows exemplary operations to manage a digital negative in view of a "save-as" or copy operation directed to a digital image. At block 1302, responsive to determining that the user or an application has instantiated a "save-as" or copy operation with respect to a digital image, the procedure 1100 makes a copy of the digital image. If the digital image already has a link to a corresponding digital negative, that link is not removed either from the digital image or from the digital negative. At block 1304, the procedure bi-directionally links the copy to the digital negative. If the digital image was not associated with a digital negative at time of the "save-as" or copy operation, a digital negative is created based on the pixel content of the digital image. Such operations were described above in reference to FIG. 3. The digital image and the newly created digital negative are then bi-directionally linked to the copy.

FIG. 14 shows further aspects of the exemplary procedure of FIG. 11. In particular FIG. 14 shows exemplary operations to manage a digital negative in view of a user implemented request to create a new photo from a digital negative. The operations of FIG. 14 are analogous to the operations described above with respect to FIG. 13, with the exception that a copy of the digital negative is made into a digital image. In particular, at block 1402, the procedure 1100 makes a copy of the digital negative. At block 1404, the procedure bi-directionally links the copy and the digital negative.

FIG. 15 shows further aspects of the exemplary procedure of FIG. 11. In particular FIG. 15 shows exemplary operations to manage a digital negative in view of a user implemented request to make a particular photo the digital negative for the photo. In particular, at block 1502, the procedure 1100 determines whether the digital image already has a connected/linked digital negative. If so, at block 1504, the procedure determines whether the digital negative is shared with a different digital image. If not, the procedure continues at block 1506, wherein the digital negative is deleted from system memory and the link from the digital image to the digital negative (digital negative link 214 of FIG. 2) is removed from the digital image. At this point, the procedure continues at block 1508, wherein a new digital negative is created for the digital image based on pixel content of the digital image.

Additionally, the digital image and the digital negative are bi-directionally linked to one another.

At block 1504, if it was determines that the subject digital image does share its associated digital negative with a different digital image, the procedure continues at block 1510. At block 1510, that link to the digital image from the digital negative (digital image link 220 of FIG. 2) is removed from the digital negative. This is performed in a manner that does not delete the digital negative from system memory so that the different one or more digital images may still rely on the digital negative for pixel content.

At block 1502, if the procedure determines that the digital image does not have a connected digital negative, the procedure continues at block 1508 as described above, wherein a digital negative is created for the digital image based on pixel content of the digital image. Additionally, the digital image and the digital negative are bi-directionally linked.

Figure 16:
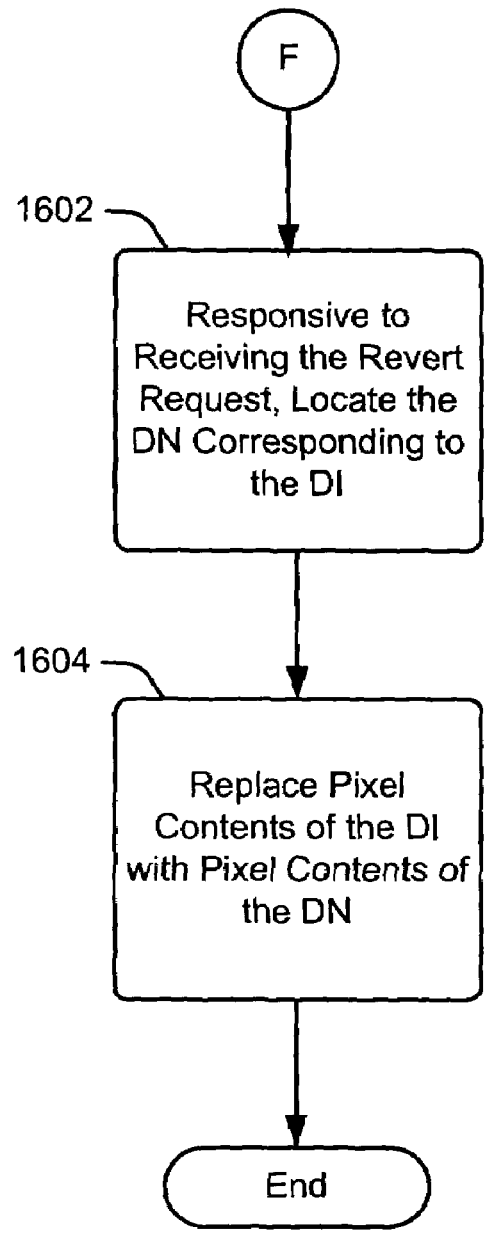
FIG. 16 shows an exemplary procedure to revert pixel content of a digital image to pixel content of a corresponding digital negative in view of a user implemented reversion request.

FIG. 16 shows further aspects of the exemplary procedure of FIG. 11. In particular FIG. 16 shows exemplary operations to revert pixel content of a digital image to pixel content of a corresponding digital negative in view of a user implemented reversion request. At block 1602, the procedure 1100 responsive to receiving a revert pixel content request with respect to a particular digital image, locates the digital negative corresponding to the digital image. As discussed above with respect to FIG. 3, depending on whether a backup engine is used to store digital negatives on external data storage devices, the digital negative may be stored externally to the computing device 110 (FIG. 1), or in a location such as a backup engine staging area.

At block 1604, pixel content of the digital image are replaced with pixel content of the digital negative.

Conclusion

The described systems and methods provide for digital negatives. Although the systems and methods have been described in language specific to structural features and methodological operations, the subject matter as defined in the appended claims are not necessarily limited to the specific features or operations described. For instance, the concept of digital negatives for images can be extended to video, music, and/or other types of data. Thus, the specific features and operations are disclosed as exemplary forms of implementing the claimed subject matter.

The invention claimed is:

1. A method for use on a computing device, the method comprising:
    creating a digital negative from digital object;
    linking the digital object to the digital negative;
    responsive to a save operation associated with the digital object:
        generating a new digital object; and
        bi-directionally linking the digital negative to the new digital object, wherein the digital negative is directly linked to the digital object on which it is based and directly linked to any versions, copies, and/or versioned copies of the digital object; and
    responsive to a revert operation associated with the new digital object, replacing content of the new digital object with content of the digital negative.

2. A method as recited in claim 1, wherein the digital object is a digital image, video, text document, and/or digital audio.

3. A method as recited in claim 1, wherein the content of the new digital object and the content of the digital negative is pixel data.

4. A method as recited in claim 1, wherein creating and linking are automatically performed by an image acquisition interface responsive to acquiring the digital object.

5. A method as recited in claim 1, wherein creating and linking are automatically performed responsive to a first edit to the digital object.

6. A method as recited in claim 1, wherein creating and linking are manually performed via user interaction with a digital negative user interface (UT) control.

7. A method as recited in claim 1, wherein linking further comprises;
    indicating in the digital object a substantially unique identifier of the digital negative; and
    inserting a substantially unique identifier of the digital object into the digital negative.

8. A method as recited in claim 1, wherein the save operation is a save-as operation, and wherein the new digital object is a copy of the digital object, and wherein direct association between the digital object and the digital negative is maintained such that any revisions to the copy can be reverted back to data of the digital negative.

9. A method as recited in claim 1, wherein the save operation is an implicit save operation associated with one or more edits to content corresponding to the digital object, wherein the new digital object comprises the one or more edits, and wherein responsive to the save operation the method further comprises:
    replacing the digital object with the new digital object to create a linear versioning history with respect to the digital object; and
    removing a link referencing the digital object from the digital negative.

10. A methods as recited in claim 1, wherein the method further comprises, responsive to the revert operation, replacing a first set of metadata associated with new digital object with metadata of the digital negative, and/or associating a second set of metadata of the new digital object to reversion results.

11. A method as recited in claim 1, wherein the method further comprises:
    exposing a digital negative management (DNM) application programming interface (API) comprising create and revert interfaces;
    wherein operations for the creating and the generating are accessed via the create interface; and
    wherein the revert operation is accessed via the revert interface.

12. A method as recited in claim 1, wherein operations for the creating, the linking, the generating, the bi-directionally linking, and the replacing are accessed via respective interfaces exposed by a digital negative management application programming interface.

13. A method as recited in claim 12, wherein the digital negative management application programming interface comprises a create interface for generating a digital negative, an exists interface for determining whether the digital object or any version or copy of the digital object has been assigned a corresponding digital negative, a delete interface for removing a digital negative from the computing system and for deleting any association between the digital negative and one or more associated digital objects, and a revert interface for replacing contents of a specified digital object with contents of a corresponding digital negative.

14. A computer-readable storage medium comprising computer-executable instructions for:
    creating a digital negative from a digital image;
    linking the digital image to the digital negative;

responsive to a save operation associated with the digital image:
  generating a new digital image; and
  bi-directionally linking the digital negative to the new digital image, wherein the digital negative is directly linked to the digital image on which it is based and directly linked to any versions, copies, and/or versioned copies of the digital image; and
responsive to a revert operation associated with the new digital image, replacing pixel content of the new digital image with pixel content of the digital negative.

15. A computer-readable storage medium as recited in claim 14, wherein the computer-executable instructions for creating and linking further comprise instructions for automatically performing the creating and the linking by an image acquisition interface in response to acquiring the digital image.

16. A computer-readable storage medium as recited in claim 14, wherein the computer-executable instructions for creating and linking are automatically performed responsive to a first edit to the digital image.

17. A computer-readable storage medium as recited in claim 14, wherein the computer-executable instructions for creating and linking are manually performed via user interaction with a digital negative user interface (UI) control.

18. A computer-readable storage medium as recited in claim 14, wherein the computer-executable instructions for linking further comprise instructions for;
  indicating in the digital image a substantially unique identifier of the digital negative; and
  inserting a substantially unique identifier of the digital image into the digital negative.

19. A computer-readable storage medium as recited in claim 14, wherein the save operation is a save-as operation, and wherein the new digital image is a copy of the digital image, and wherein direct association between the digital image and the digital negative is maintained.

20. A computer-readable storage medium as recited in claim 14, wherein the save operation is an implicit save operation associated with one or more edits to pixel content corresponding to the digital image, wherein the new digital image comprises the one or more edits, and wherein responsive to the save operation the computer-executable instructions for further comprise instructions for:
  replacing the digital image with the new digital image to create a linear versioning history with respect to the digital image; and
  removing a link referencing the digital image from the digital negative.

21. A computer-readable storage medium as recited in claim 14, wherein the computer-executable instructions further comprise instructions for:
  exposing a digital negative management (DNM) application programming interface (API) comprising create and revert interfaces;
  wherein operations for the creating and the generating are accessed via the create interface; and
  wherein the revert operation is accessed via the revert interface.

22. A computer-readable storage medium as recited in claim 14, wherein the computer-executable instructions for the creating, the linking, the generating, the bi-directionally linking, and the replacing are accessed via respective interfaces exposed by a digital negative management application programming interface.

23. A computer-readable storage medium as recited in claim 22, wherein the digital negative management application programming interface comprises a create interface for generating a digital negative, an exists interface for determining whether the digital image or any version or copy of the digital image has been assigned a corresponding digital negative, a delete interface for removing a digital negative from the computing system and for deleting any association between the digital negative and one or more associated digital images, and a revert interface for replacing pixel contents of a specified digital image with pixel contents of a corresponding digital negative.

24. A computing device comprising:
  a processor; and
  a memory coupled to the processor, the memory comprising computer-readable medium comprising computer-program instructions executable by the processor for:
  creating a digital negative from a digital image;
  linking the digital image to the digital negative;
  responsive to a save operation associated with the digital image:
    generating a new digital image; and
    bi-directionally linking the digital negative to the new digital image, wherein the digital negative is directly linked to the digital image on which it is based and directly linked to any versions, copies, and/or versioned copies of the digital image; and
  responsive to a revert operation associated with the new digital image, replacing pixel content of the new digital image with pixel content of the digital negative.

25. A computing device as recited in claim 24, wherein the computer-program instructions for creating and linking flirt her comprise instructions for automatically performing the creating and the linking by an image acquisition interface in response to acquiring the digital image.

26. A computing device as recited in claim 24, wherein the computer-program instructions for creating and linking are automatically performed responsive to a first edit to the digital image.

27. A computing device as recited in claim 24, wherein the computer-program instructions for creating and linking are manually performed via user interaction with a digital negative user interface (UI) control.

28. A computing device as recited in claim 24, wherein the computer-program instructions for linking further comprise instructions for;
  indicating in the digital image a substantially unique identifier of the digital negative; and
  inserting a substantially unique identifier of the digital image into the digital negative.

29. A computing device as recited in claim 24, wherein the save operation is a save-as operation, and wherein the new digital image is a copy of the digital image, and wherein direct association between the digital image and the digital negative is maintained.

30. A computing device as recited in claim 24, wherein the save operation is an implicit save operation associated with one or more edits to pixel content corresponding to the digital image, wherein the new digital image comprises the one or more edits, and wherein responsive to the save operation the computer-program instructions for further comprise instructions for:
  replacing the digital image with the new digital image to create a linear versioning history with respect to the digital image; and
  removing a link referencing the digital image from the digital negative.

31. A computing device as recited in claim 24, wherein the computer-program instructions further comprise instructions for:
  exposing a digital negative management (DNM) application programming interface (API) comprising create and revert interfaces;
  wherein operations for the creating and the generating are accessed via the create interface; and
  wherein the revert operation is accessed via the revert interface.

32. A computing device as recited in claim 24, wherein the computer-program instructions for the creating, the linking, the generating, the bi-directionally linking, and the replacing are accessed via respective interfaces exposed by a digital negative management application programming interface.

33. A computing device as recited in claim 32, wherein the digital negative management application programming interface comprises a create interface for generating a digital negative, an exists interface for determining whether the digital image or any version or copy of the digital image has been assigned a corresponding digital negative, a delete interface for removing a digital negative from the computing system and for deleting any association between the digital negative and one or more associated digital images, and a revert interface for replacing pixel contents of a specified digital image with pixel contents of a corresponding digital negative.

34. A computing device comprising:
  means for creating a digital negative from a digital image;
  means for linking the digital image to the digital negative;
  responsive to a save operation associated with the digital image:
    means for generating a new digital image; and
    means for bi-directionally linking the digital negative to the new digital image, wherein the digital negative is directly linked to the digital image on which it is based and directly linked to any versions, copies, and/or versioned copies of the digital image; and
  responsive to a revert operation associated with the new digital image, means for replacing pixel content of the new digital image with pixel content of the digital negative.

35. A computing device as recited in claim 34, wherein the means for creating and linking further comprise means for automatically performing the creating and the linking in response to acquiring the digital image.

36. A computing device as recited in claim 34, wherein the means for creating and linking are automatically responsive to detecting a first edit to the digital image.

37. A computing device as recited in claim 34, wherein the means for creating and linking are performed responsive to manual user interaction.

38. A computing device as recited in claim 34, wherein the means for linking substantially uniquely link the digital image and the digital negative in a bi-directional manner.

39. A computing device as recited in claim 34, wherein the save operation is a save-as operation, and wherein the new digital image is a copy of the digital image, and wherein direct association between the digital image and the digital negative is maintained.

40. A computing device as recited in claim 34, wherein the save operation is an implicit save operation associated with one or more edits to pixel content corresponding to the digital image, wherein the new digital image comprises the one or more edits, and wherein responsive to the save operation the computing device further comprises:
  means for replacing the digital image with the new digital image to create a linear versioning history with respect to the digital image; and
  means for removing a link referencing the digital image from the digital negative.

41. A computing device as recited in claim 34, wherein the computing device further comprises means for allowing one or more application programs to hook into a digital image management module to activate the means for creating, the means for linking, and the means for replacing.

42. A method for presenting a user interface, the method comprising:
  presenting an interface for a user to create and manage digital negatives across single or multiple linear picture version history progressions; and
  receiving, via the interface, an indication of an implicit save operation with respect to a digital image;
  responsive to the indication, evaluating whether the digital image has a corresponding digital negative; and
  responsive to determining that the digital image does not have a corresponding digital negative:
    generating a digital negative for the digital image such that the digital negative comprises substantially same pixel content as the digital image; and
    linking the digital image to the digital negative, wherein the digital negative is directly linked to the digital image on which it is based and directly linked to any versions, copies, and/or versioned copies of the digital image.

43. A method as recited in claim 42, wherein one or more edits to the digital image map to a new version of the digital image, the new version being associated with the implicit save operation, the digital image now being an old version, and wherein the method further comprises:
  responsive to determining that the digital image does have a corresponding digital negative:
    removing a link from the corresponding digital negative to the old version of the digital negative; and
    inserting a link into the digital negative, the link substantially uniquely identifying the new version of the digital image, the link at least for selective reversion of pixel content of the new version to pixel content of the digital negative.

44. A method as recited in claim 42, wherein the method further comprises combining concepts of a digital original of the digital image with versioning of the digital image to present a logical view across one or more linear version histories of the digital image coupled to the digital negative, the logical view being presented on a display device.

45. A method as recited in claim 42, wherein the method further comprises:
  receiving via the interface a save-as request from the user to create a copy of the digital image; and
  responsive to the request:
  making a copy of the digital image; and
  bi-directionally linking the copy to the digital negative such that both the digital image and the copy are linked to the digital negative to enable at least reversion of both or respective versions of both to pixel content of the digital negative.

46. A method as recited in claim 42, wherein the method further comprises:
  receiving via the interface a request to create a new digital image from the digital negative, the request specifying the digital image coupled to the digital negative; and responsive to the request:
  generating the new digital image from pixel content of the digital negative; and
  bi-directionally linking the new digital image to the digital negative such that both the digital image and the new digital image are linked to the digital negative, the bi-direction linking enabling at least reversion of both or respective versions of both to pixel content of the digital negative.

47. A method as recited in claim 42, wherein the method further comprises:
  receiving via the interface a request to make a digital image a digital negative for the digital image; and
  responsive to the request:
    if the digital image already has a corresponding digital negative, and if at least one different digital image is connected to the corresponding digital negative:
      removing any connection between the digital image and the corresponding digital negative without deleting the corresponding digital negative; and
      creating a digital negative linked to the digital image comprising pixel content of the digital image;
    if the digital image already has a corresponding digital negative, and no different digital image is connected to the corresponding digital negative:
      deleting the corresponding digital negative;
      removing any link from the digital image to the digital negative; and
      creating a digital negative linked to the digital image comprising pixel content of the digital image; and
    if the digital image does not have a corresponding digital negative, creating a digital negative linked to the digital image comprising pixel content of the digital image.

48. A method as recited in claim 42, wherein the method further comprises:
  receiving via the interface a request from the user to revert pixel content associated with a particular digital image to pixel content associated with a digital negative related to the particular digital image; and
  responsive to receiving the request, replacing pixel content of the digital image with pixel content of the digital negative.

49. A method as recited in claim 48 wherein the method further comprises responsive to the request, retrieving the digital negative from an external data storage device associated with a backup engine.

50. A method as recited in claim 42, wherein the method further comprises:
  receiving, via the interface, a request from the user to create a new digital image from a first digital negative stored on a data storage device associated with a backup engine; and
  responsive to receiving the request, generating the new digital image and a second digital negative from the first digital negative.

51. A method for interfacing with a digital negative management application, the method comprising:
  issuing a request to create a digital negative for a specified digital image, the request causing:
    the digital negative to be linked to the digital image, wherein the digital negative is directly linked to the digital image on which it is based and directly linked to any versions, copies, and/or versioned copies of the digital image; and
    the digital negative to be generated to comprise pixel content of the digital image at the time of the request to create; and
  communicating a request to revert pixel contents of a version of the digital image to the pixel content of the digital negative.

52. A method as recited in claim 51, wherein the request is issued responsive to acquiring the digital image or detecting first edits to pixel content of the digital image for the first time.

53. A method as recited in claim 51, wherein the request for creating causes the digital negative to be backed up by a backup engine to an external data storage device, and the digital negative to be removed from system memory.

54. A method as recited in claim 51, wherein the request for creating causes the digital negative to be stored in a backup engine staging area for backup to an external data storage device.

55. A method as recited in claim 51, wherein the method further comprises issuing a request to determine if a digital image has a corresponding digital negative connected to the digital image.

56. A method as recited in claim 51, wherein the method further comprises:
  issuing a request to remove a link to a digital image from a digital negative;
  wherein, if the digital image is an only digital image connected to the digital negative, the request causes the digital negative to be deleted; and
  wherein, if the digital image is one of multiple digital images connected to the digital negative, the request causes the link to be removed from the digital negative, the digital negative not being deleted.

* * * * *